US008176957B2

(12) United States Patent
Manesh et al.

(10) Patent No.: US 8,176,957 B2
(45) Date of Patent: May 15, 2012

(54) TENSION-BASED NON-PNEUMATIC TIRE

(75) Inventors: Ali Manesh, Chicago, IL (US); Michael John Tercha, Weston, WI (US); Brian Meliska, Weston, WI (US); Fidelis Ceranski, Marathon, WI (US); Glenn Howland, Kronenwetter, WI (US); Louie Stark, Mosinee, WI (US); Karen Hauch, Wausau, WI (US); Todd Petersen, Ringle, WI (US)

(73) Assignee: Resilient Technologies, LLC., Wausau, WI (US)

( * ) Notice: Subject to any disclaimer, the term of this patent is extended or adjusted under 35 U.S.C. 154(b) by 194 days.

(21) Appl. No.: 12/506,169

(22) Filed: Jul. 20, 2009

(65) Prior Publication Data

US 2011/0011506 A1 Jan. 20, 2011

(51) Int. Cl.
B60C 7/00 (2006.01)
(52) U.S. Cl. ............... 152/326; 152/301; 152/7
(58) Field of Classification Search .......... 152/5, 7, 152/11, 246, 300–301, 323–329; 267/279, 267/281–282, 292, 141, 141.6–141.7, 144, 267/147, 181; 248/615, 632–634, 638
See application file for complete search history.

(56) References Cited

U.S. PATENT DOCUMENTS

| 576,072 | A | 1/1897 | Humbrecht |
|---|---|---|---|
| 637,200 | A | 11/1899 | Finin |
| 654,897 | A | 7/1900 | Keller |
| 748,797 | A | 1/1904 | Schwieger |
| 818,568 | A | 4/1906 | Sims |
| 820,077 | A | 5/1906 | Whiteley |
| 856,957 | A | 6/1907 | Hubbard |
| 927,154 | A | 7/1909 | Martin |
| 987,340 | A | 3/1911 | Besler |
| 1,041,829 | A | 10/1912 | Mallory |
| 1,042,035 | A | 10/1912 | Ray |
| 1,057,734 | A | 4/1913 | Harrison |
| 1,060,480 | A | 4/1913 | Minnick |
| 1,066,267 | A | 7/1913 | Gerleit |
| 1,085,700 | A | 2/1914 | Percy |
| 1,106,238 | A | 8/1914 | Papadopoulos |

(Continued)

FOREIGN PATENT DOCUMENTS

| CN | 1154582 | 6/2004 |
|---|---|---|
| DE | 102006037666 | 2/2008 |
| EP | 0159888 | 10/1985 |

(Continued)

OTHER PUBLICATIONS

Chinese Office Action for Chinese Application No. 200880010003.6, dated Dec. 29, 2010, in 13 pages.

(Continued)

Primary Examiner — Jason Bellinger
(74) Attorney, Agent, or Firm — Knobbe, Martens, Olson & Bear LLP

(57) ABSTRACT

A non-pneumatic tire for supporting a load by working in tension comprising a generally annular inner ring, a generally annular outer ring, and an interconnected web having a plurality of web elements and comprising a plurality of generally polygonal openings. Web elements are sized, curved, oriented, and comprised of varying thicknesses of material which facilitates buckling when subjected to a compressive load. By buckling, those elements in a deformed portion of the tire between a wheel and a footprint region where the tire contacts a surface can assume a significantly reduced portion of the load, if any. This causes web elements in other portions of the interconnected web to operate in tension to support the load.

36 Claims, 17 Drawing Sheets

U.S. PATENT DOCUMENTS

| | | |
|---|---|---|
| 1,136,546 A | 4/1915 | Markson |
| 1,146,654 A | 7/1915 | Rietschel |
| 1,154,504 A | 9/1915 | Gano |
| 1,156,311 A | 10/1915 | Rabey |
| 1,190,874 A | 7/1916 | Durfee |
| 1,232,127 A | 7/1917 | Uhrinecz |
| 1,242,269 A | 10/1917 | Teeple |
| 1,244,276 A | 10/1917 | Anglemyer |
| 1,252,736 A | 1/1918 | Szakacs |
| 1,262,501 A | 4/1918 | Huetter |
| 1,262,550 A | 4/1918 | Northern |
| 1,282,690 A | 10/1918 | Hamlin |
| 1,286,634 A | 12/1918 | Holland |
| 1,287,255 A | 12/1918 | De Carmona |
| 1,292,729 A | 1/1919 | Drach |
| 1,300,933 A | 4/1919 | Divers |
| 1,365,181 A | 1/1921 | Marzak et al. |
| 1,451,517 A | 4/1923 | Smith |
| 1,461,928 A | 7/1923 | Miller |
| 1,557,437 A | 10/1925 | Dodge |
| 1,640,613 A | 8/1927 | Miller |
| 1,660,845 A | 2/1928 | Mamessier |
| 1,710,524 A | 4/1929 | Vitenko |
| 1,753,735 A | 4/1930 | Athey |
| 1,948,412 A | 2/1934 | Bennett |
| 2,055,461 A | 9/1936 | Baddock |
| 2,235,378 A | 3/1941 | Martin |
| 2,283,274 A | 5/1942 | Martin |
| 2,298,142 A | 10/1942 | Martin |
| 2,331,212 A | 10/1943 | Martin |
| 2,341,721 A | 2/1944 | Kapp |
| 2,620,844 A | 12/1952 | Lord |
| 2,701,431 A | 2/1955 | Whitesell |
| 2,742,941 A | 4/1956 | Johnson |
| 2,912,032 A | 11/1959 | Alexander |
| 3,182,705 A | 5/1965 | Markow |
| 3,188,775 A | 6/1965 | Cosmos |
| 3,219,090 A | 11/1965 | Cislo |
| 3,237,667 A | 3/1966 | Lindley |
| 3,311,149 A | 3/1967 | Mathiesen |
| 3,380,779 A | 4/1968 | Albright |
| 3,465,804 A | 9/1969 | Dupre |
| 3,493,027 A | 2/1970 | Dewhirst et al. |
| 3,635,273 A | 1/1972 | Patecell |
| 4,111,249 A | 9/1978 | Markow |
| 4,153,095 A | 5/1979 | Sarkissian |
| 4,226,273 A | 10/1980 | Long et al. |
| 4,235,270 A | 11/1980 | Kahaner et al. |
| 4,287,927 A | 9/1981 | Caravito et al. |
| 4,350,196 A | 9/1982 | Hampshire |
| 4,459,167 A | 7/1984 | Markow et al. |
| 4,549,592 A | 10/1985 | Schroder |
| 4,553,577 A | 11/1985 | Gregg |
| 4,558,727 A | 12/1985 | Golata et al. |
| 4,673,014 A | 6/1987 | Markow |
| 4,832,098 A | 5/1989 | Palinkas et al. |
| 4,894,281 A | 1/1990 | Yagi et al. |
| 4,917,162 A | 4/1990 | De Longcamp |
| 4,921,029 A | 5/1990 | Palinkas et al. |
| 4,934,425 A | 6/1990 | Gajewski et al. |
| 4,945,962 A | 8/1990 | Pajtas |
| 5,023,040 A | 6/1991 | Gajewski et al. |
| 5,042,544 A | 8/1991 | Dehasse |
| 5,050,656 A | 9/1991 | Ho |
| 5,086,815 A | 2/1992 | Panaroni |
| 5,139,066 A | 8/1992 | Jarman |
| 5,168,910 A | 12/1992 | Zhang et al. |
| 5,174,634 A | 12/1992 | Blanck |
| 5,223,599 A | 6/1993 | Gajewski |
| 5,236,027 A | 8/1993 | Lu |
| 5,265,659 A | 11/1993 | Pajtas et al. |
| 5,343,916 A | 9/1994 | Duddey et al. |
| 5,353,853 A | 10/1994 | Hanson |
| 5,460,213 A | 10/1995 | Pajtas |
| 5,494,090 A | 2/1996 | Kejha |
| 5,535,800 A | 7/1996 | Abbott |
| 5,743,316 A | 4/1998 | Chrobak |
| 6,170,544 B1 | 1/2001 | Hottebart |
| 6,279,630 B1 | 8/2001 | Herbert IMS |
| 6,298,891 B1 | 10/2001 | Harris |
| 6,364,424 B1 | 4/2002 | Lashlee et al. |
| 6,374,887 B1 | 4/2002 | Subotics |
| 6,394,407 B1 | 5/2002 | Ryaboy |
| 6,431,235 B1 | 8/2002 | Steinke |
| 6,450,222 B1 | 9/2002 | Fleming |
| 6,467,519 B1 | 10/2002 | Owen |
| 6,564,842 B2 | 5/2003 | Abinal et al. |
| 6,568,443 B2 | 5/2003 | Shoner |
| 6,615,885 B1 | 9/2003 | Ohm |
| 6,640,859 B1 | 11/2003 | Laurent et al. |
| 6,648,039 B1 | 11/2003 | Bina |
| 6,679,012 B1 | 1/2004 | Chen et al. |
| 6,681,822 B2 | 1/2004 | Adams et al. |
| 6,698,480 B1 | 3/2004 | Cornellier |
| 6,769,465 B2 | 8/2004 | Rhyne et al. |
| 6,789,810 B2 | 9/2004 | Strong |
| 6,983,776 B2 | 1/2006 | Thompson et al. |
| 6,994,134 B2 | 2/2006 | Grah |
| 6,994,135 B2 | 2/2006 | Delfino et al. |
| 7,013,939 B2 | 3/2006 | Rhyne et al. |
| 7,032,634 B2 | 4/2006 | Laurent et al. |
| 7,143,797 B2 | 12/2006 | Vannan |
| 7,174,936 B2 | 2/2007 | Becker et al. |
| 7,201,194 B2 | 4/2007 | Rhyne et al. |
| 7,418,988 B2 | 9/2008 | Cron et al. |
| 7,650,919 B2 | 1/2010 | Rhyne et al. |
| 2002/0096237 A1 | 7/2002 | Burhoe et al. |
| 2005/0076983 A1 | 4/2005 | Kimura et al. |
| 2006/0113016 A1 | 6/2006 | Cron |
| 2006/0174989 A1 | 8/2006 | Jones |
| 2007/0215259 A1 | 9/2007 | Burns |
| 2007/0267116 A1 | 11/2007 | Rhyne et al. |
| 2008/0053586 A1 | 3/2008 | Hanada et al. |
| 2008/0073014 A1 | 3/2008 | Abe |
| 2008/0149247 A1 | 6/2008 | Heuze et al. |
| 2008/0314486 A1 | 12/2008 | Manesh et al. |
| 2009/0107596 A1 | 4/2009 | Palinkas et al. |
| 2009/0173421 A1 | 7/2009 | Love et al. |
| 2009/0211674 A1 | 8/2009 | Hanada et al. |
| 2009/0211678 A1 | 8/2009 | Palinkas et al. |
| 2009/0211681 A1 | 8/2009 | Palinkas et al. |
| 2009/0250149 A1 | 10/2009 | Sebe |
| 2009/0283185 A1 | 11/2009 | Manesh et al. |
| 2009/0301625 A1 | 12/2009 | Moon et al. |

FOREIGN PATENT DOCUMENTS

| | | |
|---|---|---|
| EP | 0 159 888 B1 | 3/1991 |
| EP | 0401564 B1 | 3/1994 |
| EP | 1123817 A2 | 8/2001 |
| EP | 1902866 A1 | 3/2008 |
| EP | 1980420 | 10/2008 |
| FR | 2893274 A1 | 5/2007 |
| JP | 1-311902 | 12/1989 |
| JP | 06-109050 | 4/1994 |
| JP | 2009-269413 | 11/2009 |
| WO | WO 03/018332 | 3/2003 |
| WO | WO 2006/116807 | 11/2006 |
| WO | WO 2007/057975 | 5/2007 |
| WO | WO 2008/050503 | 5/2008 |
| WO | WO 2009/135561 A2 | 11/2009 |

OTHER PUBLICATIONS

International Search Report for International Application No. PCT/US2010/042613, dated Mar. 2, 2011, in 4 pages.
Written Opinion for International Application No. PCT/US2010/042613, dated Mar. 2, 2011, in 5 pages.
International Search Report for Application No. PCT/US08/58308, dated Aug. 7, 2008, in 2 pages.
International Search Report for Application No. PCT/US2009/058652, dated Nov. 17, 2009, in 2 pages.
Written Opinion of the International Searching Authority for Application No. PCT/US08/58308, dated Aug. 7, 2008, in 7 pages.
Written Opinion of the International Searching Authority for Application No. PCT/US2009/058652, dated Nov. 17, 2009, in 6 pages.
Chinese Notification of Decision of Rejection for Application No. 200880010003.6, dated Jun. 17, 2011, 15 pages.

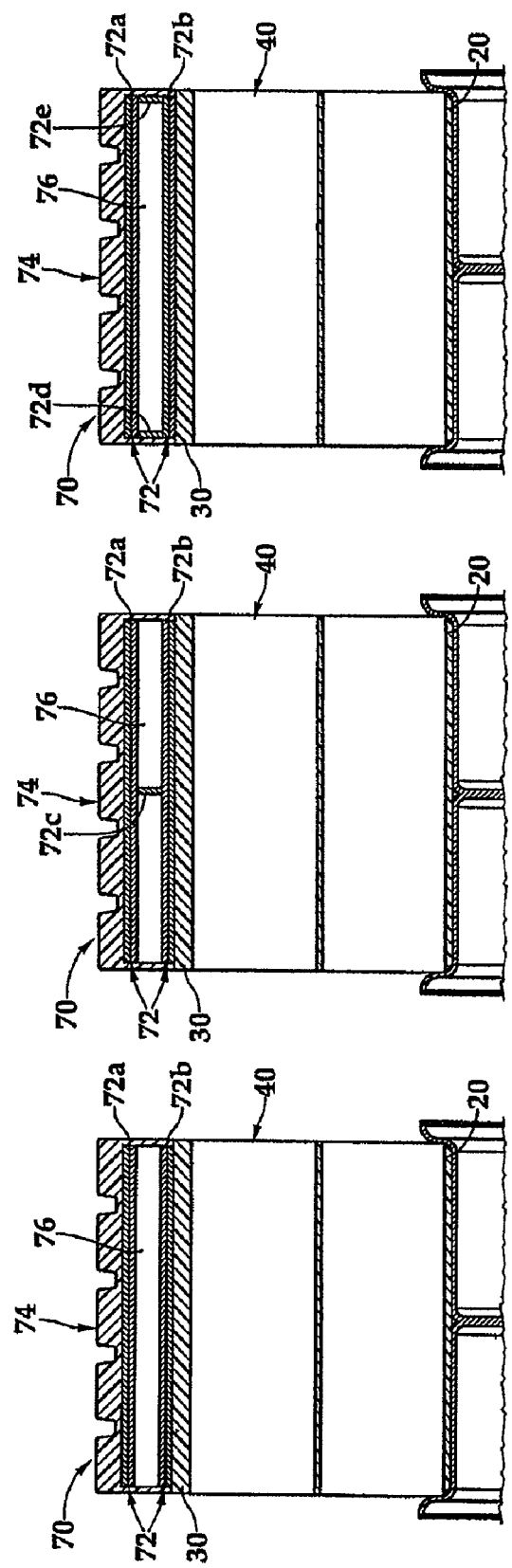

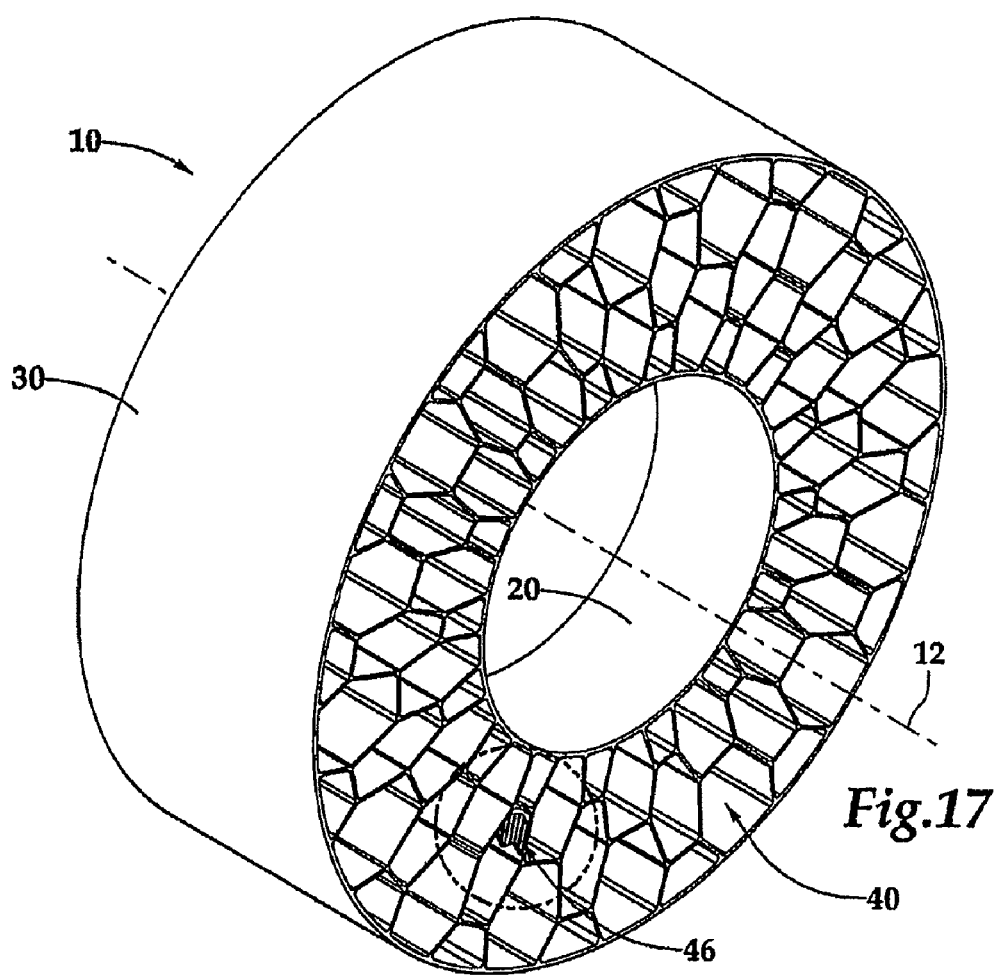
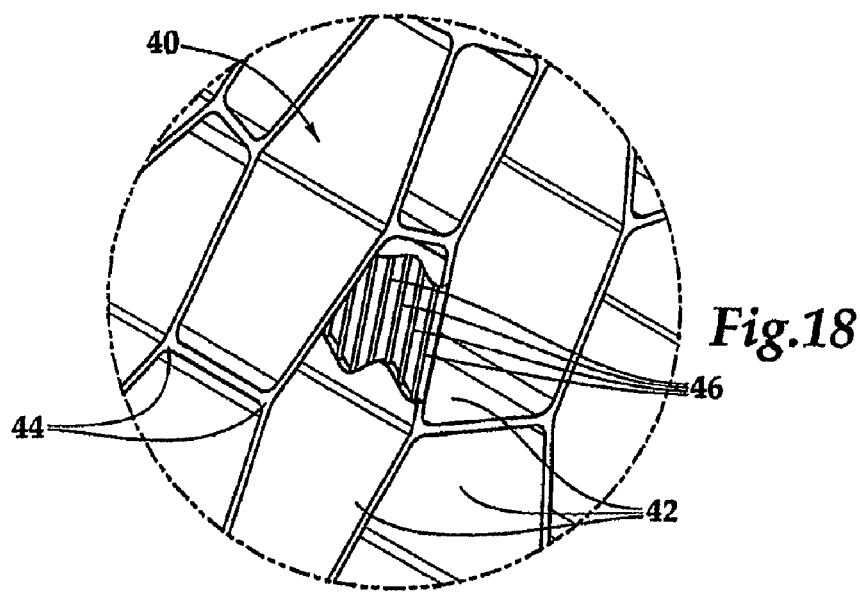

TENSION-BASED NON-PNEUMATIC TIRE

This invention was made, in part, with United States government support awarded by the United States Army Research Laboratory under contract numbers W911NF-06-2-0021 and W911QX-08-C-0034. Accordingly, the United States may have certain rights in this invention.

BACKGROUND OF THE INVENTIONS

1. Field of the Inventions

The present application is directed to a tire, and more particularly, to a non-pneumatic tire.

2. Description of the Related Art

Non-pneumatic, or airless, tires (NPT) have historically been comprised largely of an entirely solid substance. These solid tires made the ride rather uncomfortable for passengers and caused greater damage to the suspension of a vehicle, which had to compensate for the lack of "give" in a solid tire. Eventually, it was found that putting pressurized air in tires created a more comfortable ride. However, along with their advantages, pneumatic tires still possess some drawbacks.

The material that encloses standard pneumatic tires is susceptible to leaking the pressurized air it tries to withhold. This occurs both via leakage around the wheel rim, and on a smaller scale, when the rubber of the tire absorbs the oxygen. As a result, loss of pressure causes the tire to flatten in the area where the load is applied, subjecting a larger portion of the tire to the load with every revolution, and leading to quicker degradation of the tire. Furthermore, a tire reliant upon pressurized air is susceptible to being punctured leading to rapid release of the pressurized air.

Focusing on fuel efficiency, safety and ride comfort, several attempts have been made to address the problems associated with pneumatic tires while retaining their advantages over solid non-pneumatic tires. By way of example, U.S. Published Application 2006/0113016 by Cron, et al., and assigned to Michelin, discloses a non-pneumatic tire that it commercially refers to as the Tweel™. In the Tweel™, the tire combines with the wheel. It is made up of four parts that are eventually bonded together: the wheel, a spoke section, a reinforced annular band that surrounds the spoke section, and a rubber tread portion that contacts the ground.

Other alternatives to standard pneumatic tires have been attempted, including making solid tires out of polyurethane instead of rubber and suspending reinforcement materials within the polyurethane during molding. Another alternative is to use internal ribs made of a thermoplastic that are subsequently reinforced with glass fibers. A third alternative is to use an electroactive polymer that is capable of changing shape when an electrical current is applied. This allows the tire to change shape or size based upon road conditions by using the automobile's electrical system.

In addition, embodiments of non-pneumatic tires which incorporate an interconnected web to support the tire load are disclosed in U.S. Publication No. 2008-0314486, the entire contents of which is incorporated by reference herein.

SUMMARY OF THE INVENTIONS

In accordance with at least one embodiment disclosed herein, a non-pneumatic tire can comprise an inner ring that attaches to a wheel having an axis of rotation, an outer ring, and an interconnected web between the inner ring and outer ring. The interconnected web can be made of a material that is relatively stronger in tension than in compression such that the portion of the web between the wheel and a footprint region can either buckle or be subject to a significantly smaller portion of the load, if any, while the rest of the load can be distributed through the remaining portion of the interconnected web.

The interconnected web can be one of multiple possible forms. The elements of the web can form multiple layers of interfitting generally polygonal openings, such that there are at least two adjacent layers of openings spaced at different radial distances from each other when viewed at any radial slice of the web. The openings of one layer can be similarly shaped compared to the openings of at least one other layer, but they can also be shaped differently. In addition, the openings of one layer can be similarly shaped to the other openings in that same layer. Furthermore, while the openings of one layer can be similarly shaped to the openings of another layer, they can be sized differently, such that the openings of a radially outer layer can be larger or smaller than the openings of a comparatively radially inner layer.

At least one aspect of the embodiments described herein includes the realization that it would be advantageous to not only have an interconnected web, but also an interconnected web with web elements which are shaped, curved, and/or made thicker or thinner depending on the type of loading and/or buckling desired. Web elements which are curved or made thicker or thinner in portions can provide added benefit to the non-pneumatic tire by facilitating buckling in one or more directions.

Thus, in accordance with at least one embodiment disclosed herein, a non-pneumatic tire for supporting a load can comprise a generally annular inner ring having an axis of rotation, a deformable generally annular outer ring, and a flexible interconnected web extending between the inner and the outer ring, the interconnected web comprising at least two radially adjacent layers of web elements at every radial cross-section of the tire, the web elements defining a plurality of generally polygonal openings and comprising at least one radial web element that is angled relative to a plane that extends radially through the axis of rotation and at least one tangential web element that is generally transverse to the radial plane. The web elements can have first and second ends comprising connection points, the web element extending radially in a curved manner between the first and second ends. A substantial amount of the load can be supported by a plurality of the web elements working in tension.

In accordance with yet another embodiment disclosed herein, a non-pneumatic tire can comprise a generally annular inner ring that attaches to a wheel, a generally annular outer ring, an interconnected web between the generally annular inner ring and the generally annular outer ring, and an axis of rotation. The interconnected web can define a plurality of openings circumferentially spaced around the tire and radially spaced at varying distances from the axis of rotation, so as to support a load by working in tension. The interconnected web can comprise at least one web element having first and second ends defining connection points, the web element extending radially in a curved manner between the first and second ends.

In accordance with yet another embodiment disclosed herein, a non-pneumatic tire can comprise a generally annular inner ring that attaches to a wheel, a generally annular outer ring, an interconnected web between the generally annular inner ring and the generally annular outer ring, and an axis of rotation. The interconnected web can define a plurality of openings circumferentially spaced around the tire and radially spaced at varying distances from the axis of rotation, so as to support a load by working in tension. The interconnected web can comprise at least one web element, wherein the thickness of the at least one web element decreases moving radially away from the center of the tire.

In accordance with yet another embodiment disclosed herein, a non-pneumatic tire can comprise a generally annular inner ring that attaches to a wheel, a generally annular outer ring, an interconnected web between the generally annular inner ring and the generally annular outer ring, and an axis of rotation. The interconnected web can define a plurality of openings circumferentially spaced around the tire and radially spaced at varying distances from the axis of rotation, so as to support a load by working in tension. The interconnected web can comprise at least one web element having more than one thickness along its length.

BRIEF DESCRIPTION OF THE DRAWINGS

These and other features of the present embodiments will become more apparent upon reading the following detailed description and with reference to the accompanying drawings of the embodiments, in which:

FIG. 11 is a sectional view of a tread carrying portion attached to a non-pneumatic tire taken along line 11-11 in FIG. 2.

FIG. 12 is a sectional view of another tread carrying portion attached to a non-pneumatic tire taken along line 11-11 in FIG. 2.

FIG. 13 is a sectional view of still another tread carrying portion attached to a non-pneumatic tire taken along line 11-11 in FIG. 2.

FIG. 17 is a perspective view of the non-pneumatic tire of FIG. 1.

FIG. 18 is an enlarged, cutaway view of the interconnected web of the non-pneumatic tire of FIG. 17.

DETAILED DESCRIPTION OF THE PREFERRED EMBODIMENTS

Figure 1:
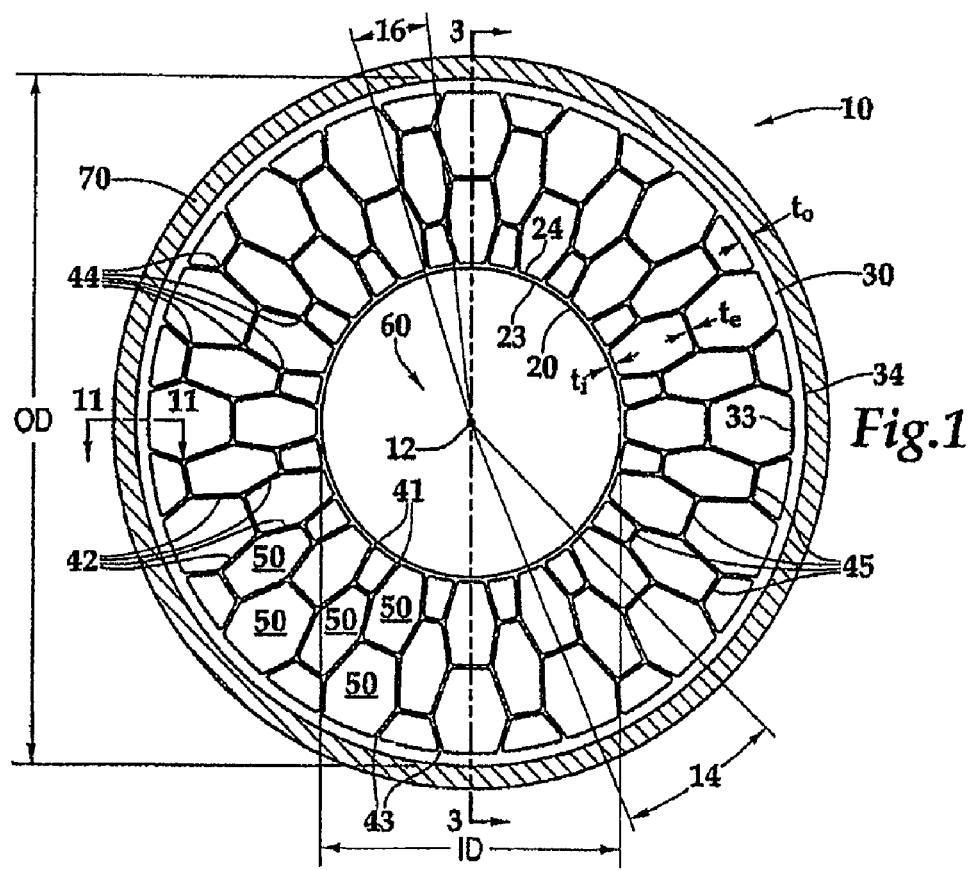
FIG. 1 is a front view of an undeformed non-pneumatic tire.
Figure 2:
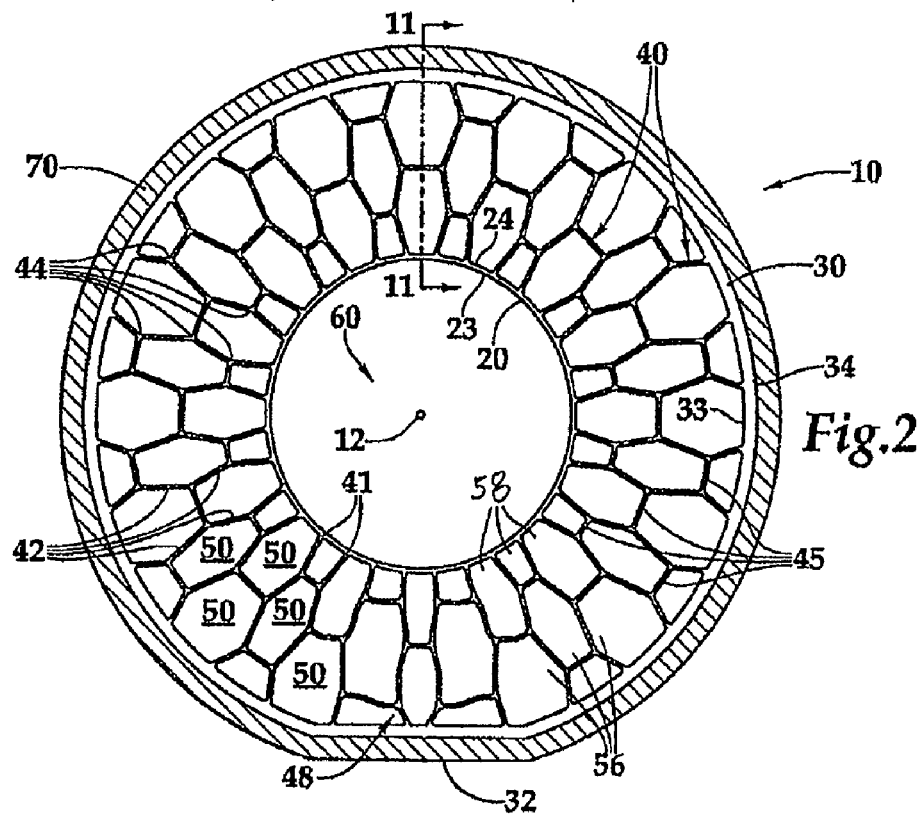
FIG. 2 is a front view of the non-pneumatic tire of FIG. 1 being deformed when subjected to a load.
Figure 3:
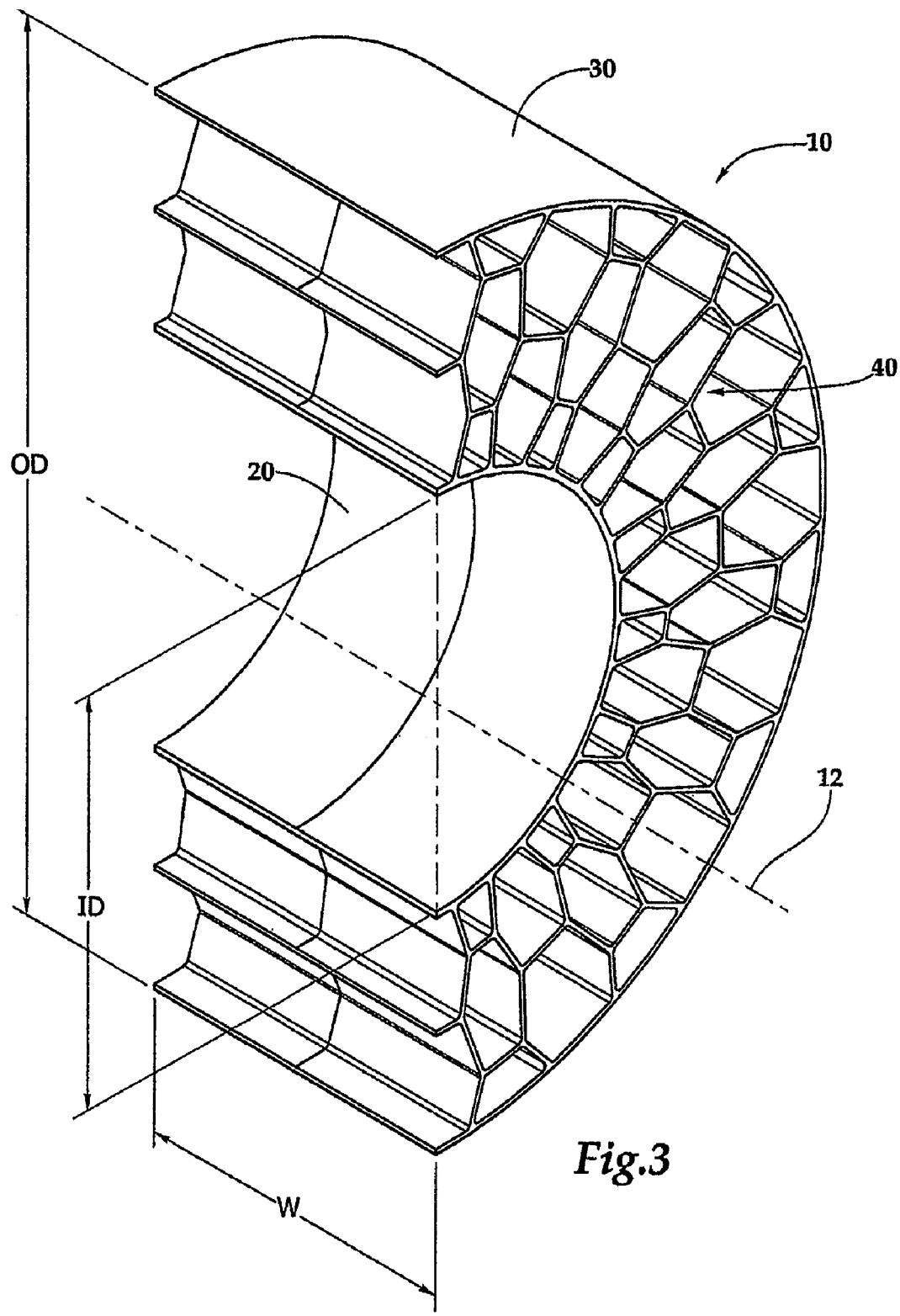
FIG. 3 is a sectional perspective view of the undeformed non-pneumatic tire taken along line 3-3 in FIG. 1.
Figure 4:
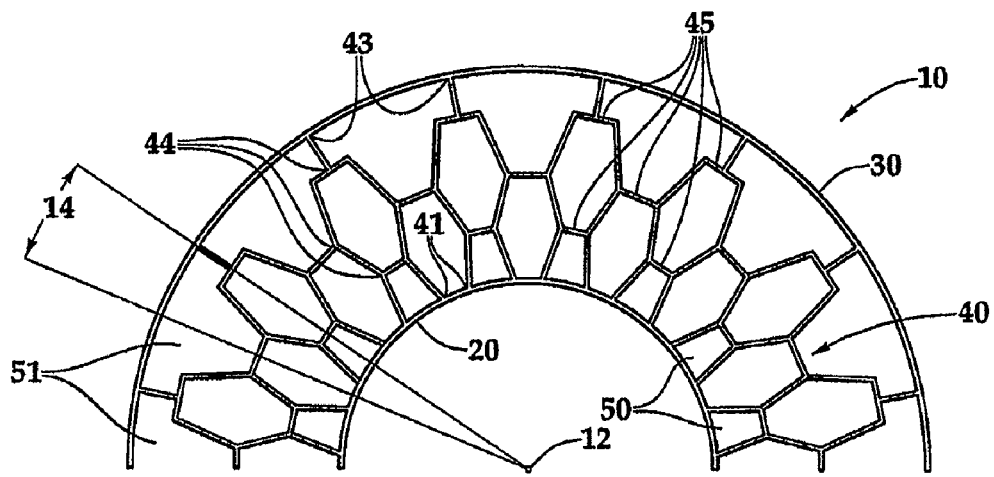
FIG. 4 is a front view of another embodiment of an undeformed non-pneumatic tire.
Figure 5:
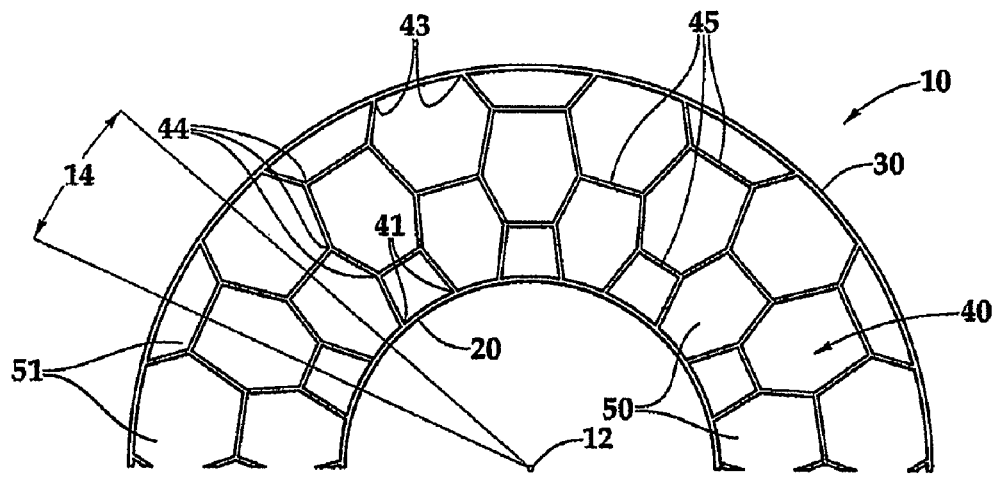
FIG. 5 is a front view of still another embodiment of an undeformed non-pneumatic tire.
Figure 6:
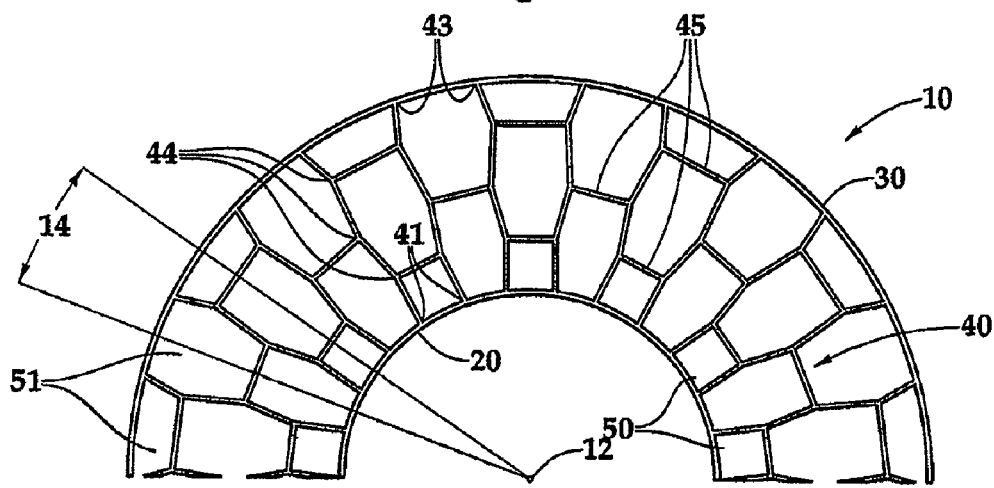
FIG. 6 is a front view of a further embodiment of an undeformed non-pneumatic tire.

FIGS. 1, 2 and 3 illustrate an embodiment of a non-pneumatic tire 10 having certain features and advantages according to an embodiment of the present invention. In the illustrated embodiment, the non-pneumatic tire 10 comprises a generally annular inner ring 20 that engages a wheel 60 to which tire 10 is mounted. The wheel 60 has an axis of rotation 12 about which tire 10 spins. The generally annular inner ring 20 comprises an internal surface 23 and an external surface 24 and can be made of cross-linked or uncross-linked polymers. In one embodiment, the generally annular inner ring 20 can be made of a thermoplastic material such as a thermoplastic elastomer, a thermoplastic urethane or a thermoplastic vulcanizate. In another embodiment, the generally annular inner ring 20 can be made of rubber, polyurethane, and/or other suitable material. In this application, the term "polymer" means cross-linked or uncross-linked polymers.

For smaller applied loads, L, the generally annular inner ring 20 can be adhesively engaged with wheel 60 or can undergo some chemical structure change allowing it to bond to the wheel 60. For larger applied loads, L, the generally annular inner ring 20 can be engaged to the wheel 60 via some form of a mechanical connection such as a mating fit, although a mechanical connection can be used for supporting smaller loads as well. The mechanical engagement can provide both the wheel 60 and the generally annular inner ring 20 with extra strength to support the larger applied load, L. In addition, a mechanical connection has the added benefit of ease of interchangeability. For example, if the non-pneumatic tire 10 needs to be replaced, generally annular inner ring 20 can be detached from wheel 60 and replaced. The wheel 60 can then be remounted to the axle of the vehicle, allowing the wheel 60 to be reusable. In another embodiment, the inner ring 20 can be connected to the wheel 60 by a combination of a mechanical and adhesive connection.

With continued reference to FIGS. 1, 2 and 3, the non-pneumatic tire 10 further comprises a generally annular outer ring 30 surrounding an interconnected web 40 (discussed below). The outer ring 30 can be configured to deform in an area around and including a footprint region 32 (see FIG. 2), which decreases vibration and increases ride comfort. However, since in some embodiments the non-pneumatic tire 10 does not have a sidewall, the generally annular outer ring 30, combined with the interconnected web 40, can also add lateral stiffness to the tire 10 so that the tire 10 does not unacceptably deform in portions away from the footprint region 32.

In one embodiment, the generally annular inner ring 20 and a generally annular outer ring 30 are made of the same material as interconnected web 40. The generally annular inner ring 20 and the generally annular outer ring 30 and the interconnected web 40 can be made by injection or compression molding, castable polymer, or any other method generally known in the art and can be formed at the same time so that their attachment is formed by the material comprising the inner ring 20, the outer ring 30 and the interconnected web 40 cooling and setting.

As shown in FIGS. 1, 2 and 3, the interconnected web 40 of non-pneumatic tire 10 connects the generally annular inner ring 20 to the generally annular outer ring 30. In the illustrated embodiment, the interconnected web 40 comprises at least two radially adjacent layers 56, 58 of web elements 42 that define a plurality of generally polygonal openings 50. In other words, with at least two adjacent layers 56, 58, a slice through any radial portion of the non-pneumatic tire 10 extending from the axis of the rotation 12 to the generally annular outer ring 30 passes through or traverses at least two generally polygonal openings 50. The polygonal openings 50 can form various shapes, some of which are shown in FIGS. 4-10 and 19-21. In many embodiments, a majority of generally polygonal openings 50 can be generally hexagonal shape with six sides. However, it is possible that each one of the plurality of generally polygonal openings 50 has at least three sides. In one embodiment, the plurality of generally polygonal openings 50 are either generally hexagonal in shape or hexagonal in shape circumferentially separated by openings that are generally trapezoidal in shape, as can be seen in FIG. 1, giving interconnected web 40 a shape that can resemble a honeycomb.

A preferred range of angles between any two interconnected web elements (moving radially from the tread portion of the tire to the wheel) can be between 80 and 180 degrees (See, for example, the web elements of FIG. 1). Other ranges are also possible.

With continued reference to the illustrated embodiment of FIGS. 1, 2 and 3, the interconnected web 40 can be arranged such that one web element 42 connects to the generally annular inner ring 20 at any given point or line along the generally annular inner ring 20 such that there are a first set of connections 41 along the generally annular inner ring 20. Likewise, one web element 42 can connect to the generally annular outer ring 30 at any given point or line along an internal surface 33 of the generally annular outer ring 30 such that there are a second set of connections 43 along the generally annular outer ring 30. However, more than one web element 42 can connect to either the generally annular inner ring 20 or to the generally annular outer ring 30 at any given point or line.

As shown in FIGS. 4-10, the interconnected web 40 can further comprise intersections 44 between web elements 42 in order to distribute applied load, L, throughout the interconnected web 40. In these illustrated embodiments, each intersection 44 joins at least three web elements 42. However, in other embodiments, the intersections 44 can join more than three web elements 42, which can assist in further distributing the stresses and strains experienced by web elements 42.

With continued reference to FIGS. 4-10, the web elements 42 can be angled relative to a radial plane 16 containing the axis of rotation 12 that also passes through web element 42. By angling the web elements 42, applied load, L, which is generally applied perpendicular to the axis of rotation 12, can be eccentrically applied to the web elements 42. This can create a rotational or bending component of an applied load on each web element 42, facilitating buckling of those web elements 42 subjected to a compressive load. Similarly situated web elements 42 can all be angled by about the same amount and in the same direction relative to radial planes 16. Preferably, however, the circumferentially consecutive web elements 42, excluding tangential web elements 45, of a layer of plurality of generally polygonal openings 50 are angled by about the same magnitude but measured in opposite directions about radial planes such that web elements 42 are generally mirror images about radial plane 16 of one another.

Figure 7:
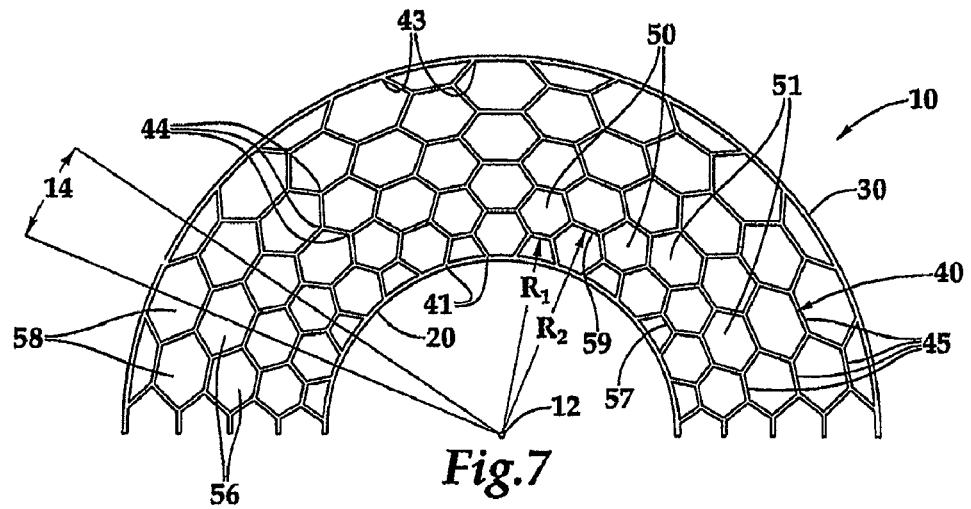
FIG. 7 is a front view of yet another embodiment of an undeformed non-pneumatic tire.

Each of the openings within the plurality of generally polygonal tubular openings 50 can, but is not required, to be similar in shape. FIG. 7, for example shows a first plurality of generally polygonal openings 50 that is different in shape from a second plurality of generally polygonal openings 51. In this embodiment, at least one opening of the first plurality of general polygonal openings 50 can be smaller than at least one opening of the second plurality of generally polygonal openings 51. FIG. 7 also shows that each generally polygonal opening in the first plurality of generally polygonal openings 50 has an inner boundary 57 spaced a radial distance, $R_1$, from axis of rotation 12 and each generally polygonal opening in the second plurality of generally polygonal openings 51, has a second inner boundary 59 spaced a radial distance, $R_2$, which can be greater than $R_1$, from axis of rotation 12.

The number of openings 50 within the interconnected web 40 can vary. For example, the interconnected web 40 can have five differently sized openings patterned 16 times for a total of 80 cells, such as in FIG. 1. In yet other embodiments, other numbers of openings 50 can be used other than 16. For example, in preferred embodiments the interconnected web 40 could include between 12-64 patterns of cells. Other numbers outside of this range are also possible.

Figure 8:
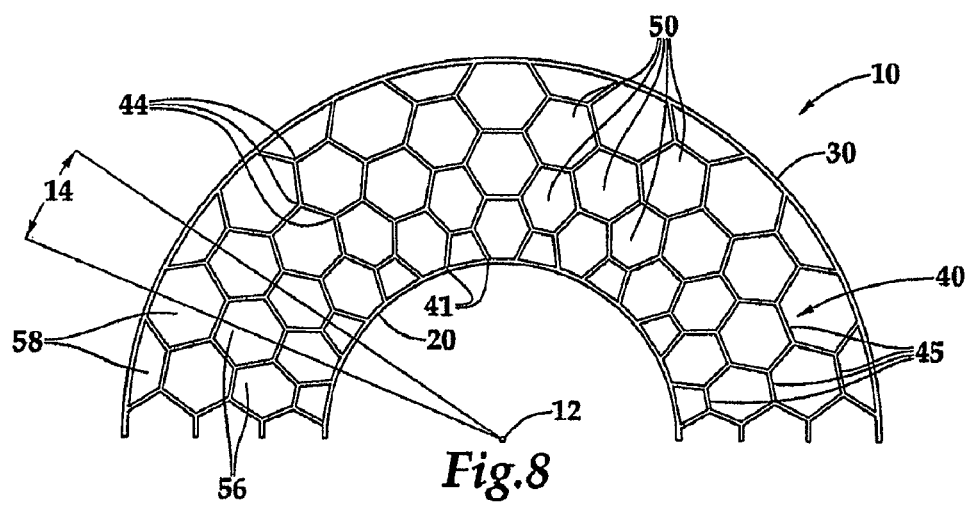
FIG. 8 is a front view of another embodiment of an undeformed non-pneumatic tire.

As shown in FIGS. 7 and 8, openings in a radially inner layer 56 can be similarly shaped as compared to those in a radially outer layer 58 but can be sized differently from those openings such that the generally polygonal openings 50 increase in size when moving from opening to opening in a radially outward direction. However, turning to FIG. 10, a second plurality of generally polygonal openings 51 in a radially outer layer 58 can also be smaller than those in a first plurality of generally polygonal openings 50 in a radially inner layer 56. In addition, the second plurality of generally polygonal openings can be either circumferentially separated from each other by a third plurality of generally polygonal openings 53 or can be greater in number than the first plurality of generally polygonal openings 50, or it can be both.

As noted above, FIGS. 1-9 show several variations of a plurality of generally polygonal openings 50 that are generally hexagonally shaped. As shown, these openings can be symmetrical in one direction or in two directions, or, in another embodiment, they are not symmetrical. For example, in FIG. 1, radial symmetry planes 14 bisect several of the plurality of generally polygonal openings 50. Those openings are generally symmetrical about radial symmetry planes 14. However, interconnected web 40 of tire 10 can also be generally symmetrical as a whole about radial symmetry planes. In comparison, a second plurality of generally polygonal openings 14 can be generally symmetrical about similar radial symmetry planes 14. In addition, as shown in FIGS. 7-8, a second plurality of generally polygonal openings can be generally symmetrical about lines tangent to a cylinder commonly centered with axis of rotation 12, providing a second degree of symmetry.

Figure 9:
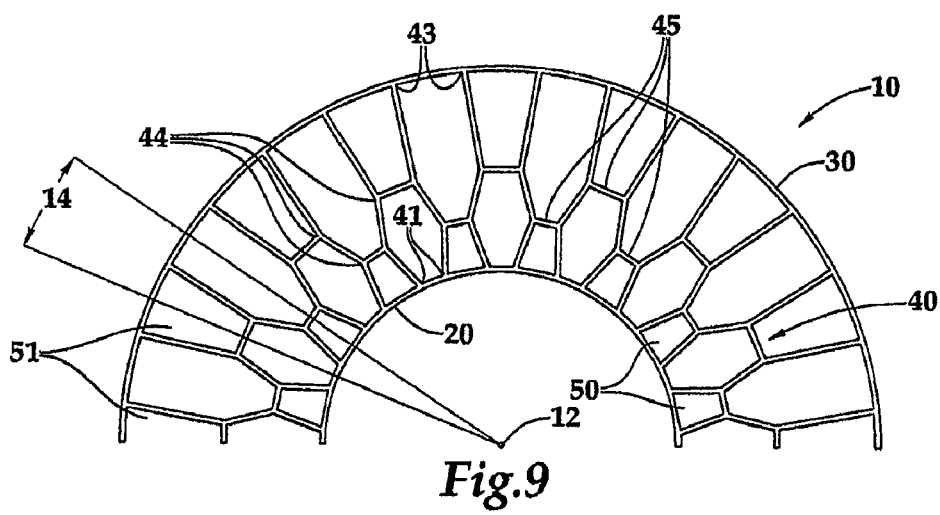
FIG. 9 is a front view of still another embodiment of an undeformed non-pneumatic tire.
Figure 10:
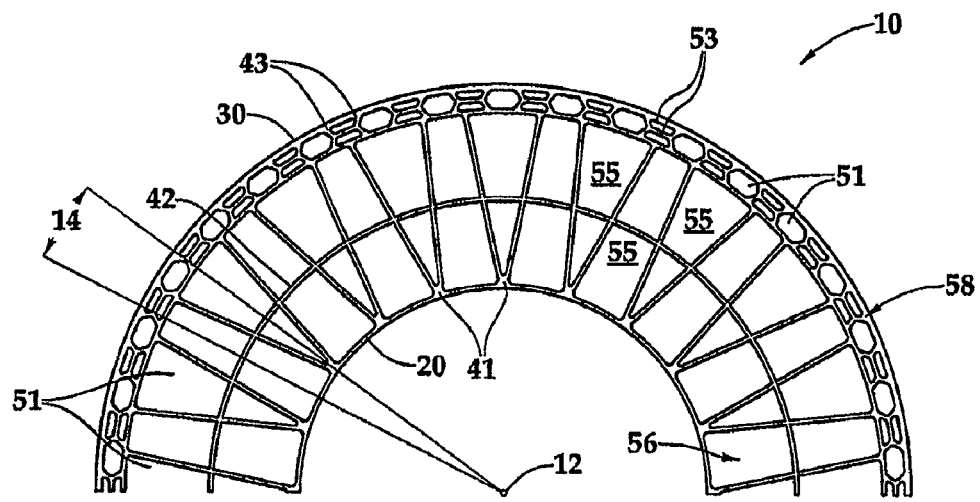
FIG. 10 is a front view of still another embodiment of an undeformed non-pneumatic tire.

The web elements 42 can have significantly varying lengths from one embodiment to another or within the same embodiment. For example, the interconnected web 40 in FIG. 7 comprises web elements 42 that are generally shorter than web elements of the interconnected web shown in FIG. 6. As a result, interconnected web 42 can appear denser in FIG. 7, with more web elements 42 and more generally polygonal openings 50 in a given arc of tire 10. In comparison, FIGS. 9 and 10 both show interconnected webs 40 which web elements 42 substantially vary in length within the same interconnected web. In FIG. 9, radially inward web elements 42 are generally shorter than web elements 42 located comparatively radially outward. However, FIG. 10 shows radially inward web elements 42 that are substantially longer than its radially outward web elements 42. As a result, interconnected web 40 of FIG. 9 appears more inwardly dense than interconnected web 42 of FIG. 10.

With continued reference to FIG. 10, an interconnected web 40 is shown such that web elements 42 define a radially inner layer 56 of generally polygonal openings 50 that is significantly larger than a radially outer layer 58 of generally polygonal openings 50. Radially inner layer 56 can comprise alternating wedge-shaped openings 55 that may or may not be similarly shaped. As shown, second plurality of generally polygonal openings 51 can be separated from first plurality of generally polygonal openings 50 by a generally continuous web element 42 of interconnected web 40 spaced at a generally constant radial distance from axis of rotation 12. The generally continuous, generally constant web element 42 can assist in providing further stiffness to non-pneumatic tire 10 in regions that are resistant to deformation.

With reference back to FIG. 2, the combination of the geometry of interconnected web 40 and the material chosen in interconnected web 40 can enable an applied load, L, to be distributed throughout the web elements 42. Because the web elements 42 are preferably relatively thin and can be made of a material that is relatively weak in compression, those elements 42 that are subjected to compressive forces may have a tendency to buckle. These elements are generally between the applied load, L, that generally passes through axis of rotation 12 and footprint region 32 and are represented as buckled section 48 in FIG. 2.

In one embodiment, some or all of the web elements 42 can be provided with weakened (e.g., previously bent) or thinned sections such that the web elements 42 preferentially bend and/or are biased to bend in a certain direction. For example, in one embodiment, the web elements are biased such that they bend generally in an outwardly direction. In this manner, web elements do not contact or rub against each as they buckle. In addition, the position of the weakened or thinned portion can be used to control the location of the bending or buckling to avoid such contact.

When buckling occurs, the remaining web elements 42 may experience a tensile force. It is these web elements 42 that support the applied load L. Although relatively thin, because web elements 42 can have a high tensile modulus, E, they can have a smaller tendency to deform but instead can help maintain the shape of the tread carrying layer 70. In this manner, the tread carrying layer 70 can support the applied load L on the tire 10 as the applied load L is transmitted by tension through the web elements 42. The tread carrying layer 70, in turn, acts as an arch and provides support. Accordingly, the tread carrying layer 70 is preferably sufficiently stiff to support the web elements 42 that are in tension and supporting the load L. Preferably a substantial amount of said applied load L is supported by the plurality of said web elements working in tension. For example, in one embodiment, at least 75% of the load is supported in tension, in another embodiment at least 85% of the load is supported in tension and in another embodiment at least 95% of the load is supported in tension. In other embodiments, less than 75% of the load can be supported in tension.

Although the generally annular inner ring 20, the generally annular outer ring 30, and the interconnected web 40 can be comprised of the same material, they can all have different thicknesses. That is, the generally annular inner ring can have a first thickness, $t_i$, the generally annular outer ring can have a second thickness, $t_o$, and the interconnected web can have a third thickness, $t_e$. As shown in FIG. 1, in one embodiment, the first thickness $t_i$ can be less than the second thickness $t_o$. However, the third thickness, $t_e$, can be less than either first thickness, $t_i$, or the second thickness, $t_o$. This illustrated arrangement is presently preferred as a thinner web element 42 buckles more easily when subjected to a compressive force whereas a relatively thicker generally annular inner ring 20 and the generally annular outer ring 30 can advantageously help maintain lateral stiffness of non-pneumatic tire 10 in an unbuckled region by better resisting deformation.

The thickness, $t_e$, of web elements 42 can vary, depending on predetermined load capability requirements. For example, as the applied load, L, increases, the web elements 42 can increase in thickness, $t_e$, to provide increased tensile strength, reducing the size of the openings in the plurality of generally polygonal openings 50. However, the thickness, $t_e$, should not increase too much so as to inhibit buckling of those web elements 42 subject to a compressive load. As with choice of material, the thickness, $t_e$, can increase significantly with increases in the applied load L. For example, in certain non-limiting embodiments, each web element 42 of interconnected web 40 can have a thickness, $t_e$ between about 0.04 inch and 0.1 inch thick for tire loads of about 0-1000 lbs, between about 0.1 and 0.25 inch thick for loads of about 500-5000 lbs, and between 0.25 and 0.5 inch thick for loads of about 2000 lbs or greater. Those of skill in the art will recognize that these thicknesses can be decreased or increased in modified embodiments.

In addition to the web elements 42 that are generally angled relative to radial planes 16 passing through axis of rotation 12, the interconnected web 40 can also include tangential web elements 45, as shown in FIGS. 1-9. The tangential web elements 45 can be oriented such that they are generally aligned with tangents to cylinders or circles centered at axis of rotation 12. The tangential web elements 45 are preferred because they assist in distributing applied load L. For example, when the applied load L, is applied, the web elements 42 in a region above axis of rotation 12 are subjected to a tensile force. Without the tangential web elements 45, interconnected web 40 may try to deform by having the other web elements 42 straighten out, orienting themselves in a generally radial direction, resulting in stress concentrations in localized areas. However, by being oriented in a generally tangential direction, the tangential web elements 45 distribute the applied load, L throughout the rest of interconnected web 40, thereby minimizing stress concentrations.

Staying with FIGS. 1-9 the plurality of generally polygonal openings 50 are shown wherein each one of said plurality of generally polygonal openings 50 is radially oriented. As noted above, the generally polygonal openings 50 can be oriented such that they are symmetrical about radial symmetry planes 14 that pass through axis of rotation 12. This arrangement can facilitate installation by allowing tire 10 to still function properly even if it is installed backwards because it should behave in the same manner regardless of its installed orientation.

As shown in FIG. 1, the generally annular outer ring 30 can have a radially external surface 34 to which a tread carrying layer 70 is attached. Attachment can be done adhesively or using other methods commonly available in the art. In addition, as seen in FIG. 11-13, the tread carrying layer 70 can comprise embedded reinforcing belts 72 to add increased overall stiffness to the non-pneumatic tire 10 wherein the embedding of the reinforcing belts 72 is accomplished according to methods commonly available in the art. Reinforcing belts 72 can be made of steel or other strengthening materials.

FIGS. 11-13 show several possible examples of the arrangement of the reinforcing belts 72 in tread carrying layer 70. FIG. 11 is a version showing a tread 74 at a radial outermost portion of the tire 10. Moving radially inwardly are a plurality of reinforcing belts 72a, a layer of support material 76, which forms a shear layer, and a second plurality of reinforcing belts 72b. In this embodiment, the reinforcing belts 72a, 72b are arranged so that each belt is a generally constant radial distance from axis of rotation 12.

Turning to the embodiment of FIG. 12, a tread carrying layer 70 similar to that of FIG. 11 is shown. However, the embodiment of FIG. 12 shows the layer of support material 76 being approximately bisected in a generally radial direction by at least one transverse reinforcing belt 72c. Support material 76 can be a rubber, polyurethane or similar compound that as a footprint is formed by the tire, the support material 76 between the reinforcing belts 72 is subjected to a shear force. Thus, the support layer 76 provides the tread carrying layer 70 with increased stiffness.

The tread carrying layer 70 of FIG. 13 resembles that of FIG. 11 but comprises two additional groupings of reinforcing belts 72. In addition to the generally radially constant plurality of reinforcing belts 72a, 72b, the tread carrying layer 70 in FIG. 13 includes transverse reinforcing belts 72d, 72e. The transverse reinforcing belts 72d, 72e include at least one reinforcing belt 72d proximate a longitudinally inner surface and at least one reinforcing belt 72e proximate a longitudinally outer surface, such that reinforcing belts 72a, 72b, 72d, 72e generally enclose layer of support material 76 in a generally rectangular box shape.

The reinforcing belts 72 and the support material 76 as described above generally form a shear layer. As a footprint is formed by the tire, the support material 76 between the reinforcing belts is subjected to a shear force. Thus, the support layer 75 provides the tread carrying layer with increased stiffness.

In one embodiment, the shear layer (support material) 76 has a thickness that is in the range from about 0 inches (i.e., no shear layer) to about 1 inch think (as measured along a radius extending from the axis of rotation). In other heavy load applications, the shear layer 76 can have a thickness greater than 1 inch.

Figure 14:
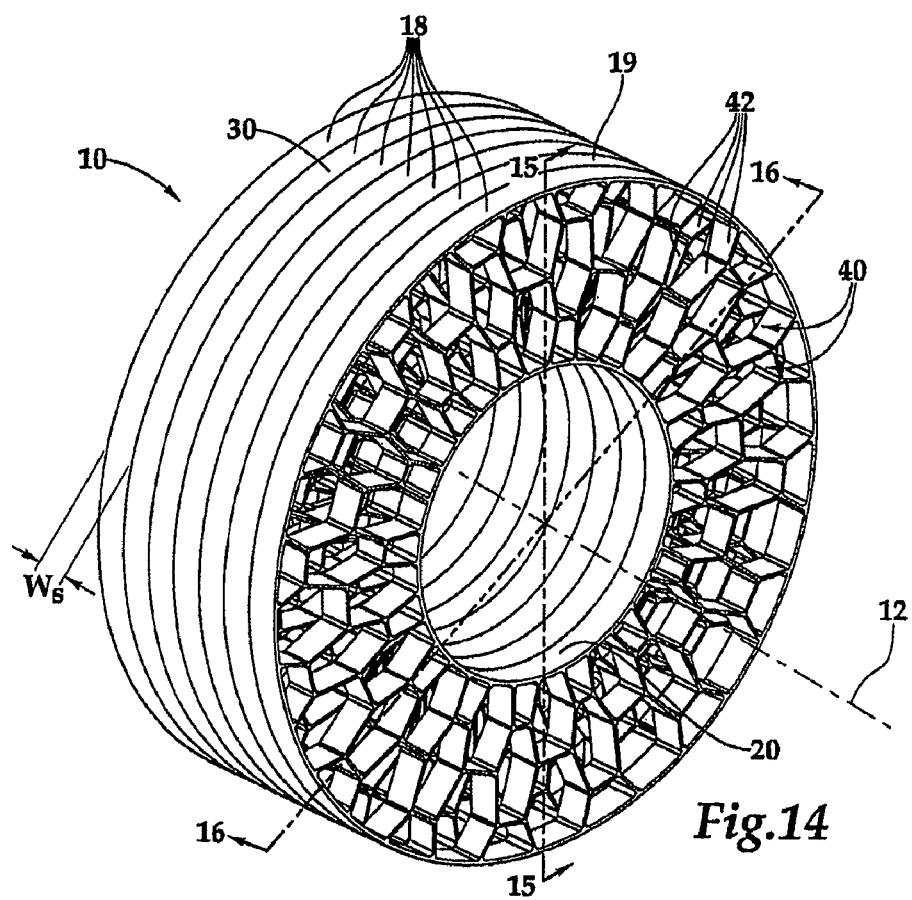
FIG. 14 is a perspective view of an embodiment of an undeformed non-pneumatic tire with circumferentially offset segments.
Figure 15:
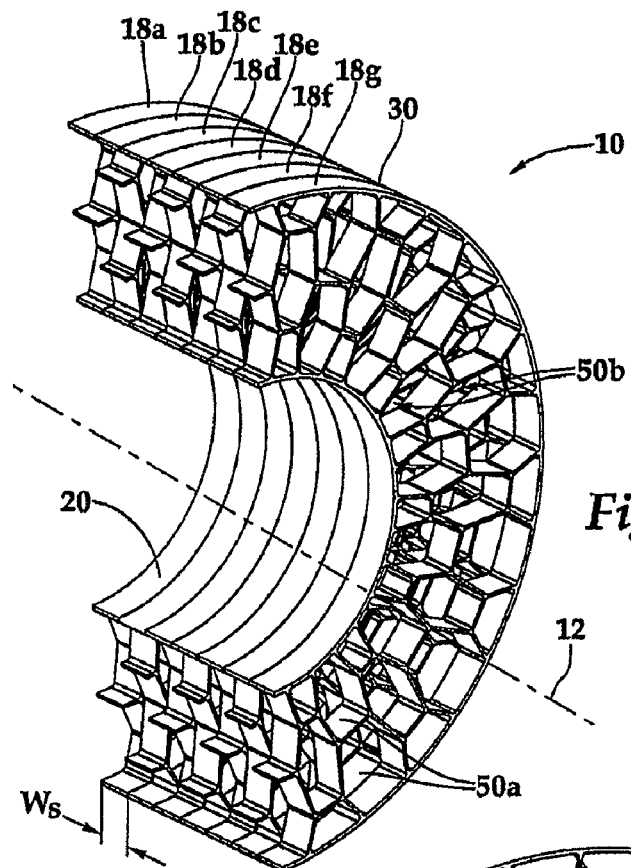
FIG. 15 is a sectional perspective view of the undeformed non-pneumatic tire taken along line 15-15 in FIG. 14.
Figure 16:
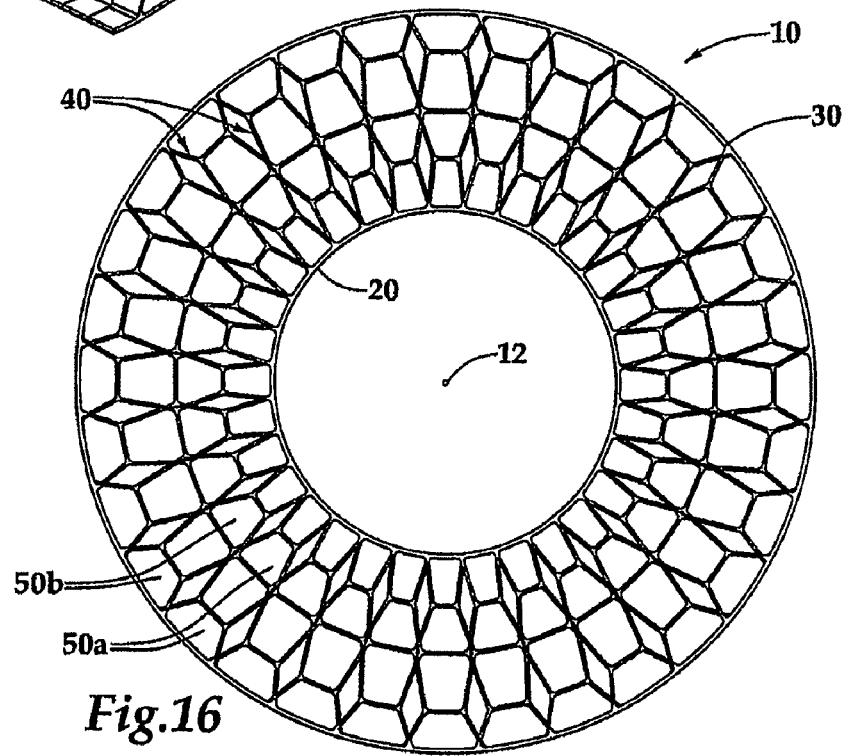
FIG. 16 is a front view of the undeformed non-pneumatic tire as viewed from the line 16-16 in FIG. 14.

The interconnected web 40, the generally annular inner ring 20 and the generally annular outer ring 30 can be molded all at once to yield a product that has a width or depth of the finished non-pneumatic tire. However, the interconnected web 40, the generally annular inner ring 20 and the generally annular outer ring 30 can be manufactured in steps and then assembled as seen in the embodiments of FIGS. 14-16. In these figures, each segment 18 has an interconnected web 40 having the same pattern as the non-pneumatic tire 10 of FIG. 1.

FIG. 14 shows a perspective view of an embodiment where the tire 10 comprises a plurality of segments 18. Each segment 18 can have a generally uniform width, $W_S$, but they can also have different widths in modified embodiments. The segments 18 can be made from the same mold so as to yield generally identical interconnected webs 40, but they can also be made from different molds to yield varying patterns of interconnected webs 40. In addition, as seen in FIGS. 14, 15 and 16, segments 18 can be circumferentially offset from one another so that a plurality of generally polygonal openings 50a of one segment 18 is not generally aligned with a plurality of similarly-shaped generally polygonal openings 50b of a radially adjacent segment 19. The segments can alternate so that every other segment 18 is generally aligned. In another embodiment, the segments do no alternate. FIG. 15 shows an embodiment having seven segments 18, where the first, third, fifth and seventh segments 18a, 18c, 18e and 18g are generally aligned with each other, the second, fourth and six segments 18b, 18d, and 18f are generally aligned with each other, but the two groups of segments are not generally aligned as a whole. In addition, FIG. 15 is a cutaway view showing two radially adjacent segments 18, 19 that are not generally aligned. This stacking orientation can help with buckling around the footprint region 32, can decrease vibration and noise, and can provide greater torsional stiffness to non-pneumatic tire 10.

In some embodiments, a non-pneumatic tire 10 can be made more or less stiff by adding or removing layers and/or segments of interconnected webbing 40. For example, and with continued reference to FIG. 14, an additional segment 18 can be added to the tire 10 to increase its stiffness, bringing the total number of segments to eight. The additional segment 18 can be added during production of the tire, or, if the tire has already been produced, the segment 18 can be added mechanically, such as by fasteners, adhesion, or other processes. In some embodiments, a tire 10 can start with one segment and/or layer of webbing, and if greater stiffness is required, a second segment and/or layer can be added to the tire 10. If a smaller tire less stiff tire is desired, a segment and/or layer can be removed. The addition and removal of segments and/or layers can be beneficial, for example, in the context of a large trailer which experiences a wide range of loading. When the trailer is expected to experience a heavier load, the tire 10 can be reinforced by adding another segment or segments 18 of interconnected webbing 40, and if desired, the segment or segments 18 can subsequently be removed at a later point. In such an embodiment, tire 10 can comprise a modular system in which the use can be provided with several segments. For light loads, only one or a few segments are placed on to the wheel 60 of the vehicle. Then with larger loads additional segments can be slipped onto or otherwise attached to the wheel.

The choice of materials used for interconnected web 40 may be an important consideration. In one embodiment, the material that is used will buckle easily in compression, but be capable of supporting the required load in tension. Preferably, the interconnected web 40 is made of a cross-linked or uncross-linked polymer, such as a thermoplastic elastomer, a thermoplastic urethane, or a thermoplastic vulcanizate. More generally, in one embodiment, the interconnected web 40 can preferably be made of a relatively hard material having a durometer measurement of about 80A-95A, and in one embodiment 92A (40D) with a high tensile modulus, E, of about 21 MPa or about 3050 psi or in other embodiments between about 3000 psi to about 8000 psi. However, tensile modulus can vary significantly for rubber or other elastomeric materials, so this is a very general approximation. In addition, durometer and tensile modulus requirements can vary greatly with load capability requirements.

The polymer materials discussed above for the interconnected web 40, the inner ring 20, and/or the outer ring 30 can additionally include additives configured to enhance the performance of the tire 10. For example, in one embodiment, the polymer materials can include one or more of the following: antioxidants, light stabilizers, plasticizers, acid scavengers, lubricants, polymer processing aids, anti-blocking additives, antistatic additives, antimicrobials, chemical blowing agents, peroxides, colorants, optical brighteners, fillers and reinforcements, nucleating agents, and/or additives for recycling purposes.

Other advantages can be obtained when using a polymer material such as polyurethane to make non-pneumatic tire 10 instead of the rubber of traditional tires. A manufacturer of the illustrated embodiments can only need a fraction of the square footage of work space and capital investment required to make rubber tires. The amount of skilled labor necessary can be significantly less than that of a rubber tire plant. In addition, waste produced by manufacturing components from a polyurethane material can be substantially less than when using rubber. This is also reflected in the comparative cleanliness of polyurethane plants, allowing them to be built in cities without the need for isolation, so shipping costs can be cut down. Furthermore, products made of polyurethane can be more easily recyclable.

Cross-linked and uncross-linked polymers, including polyurethane and other similar non-rubber elastomeric materials can operate at cooler temperatures, resulting in less wear and an extended fatigue life of tire 10. In addition, the choice of materials for interconnected web 40 and outer ring 30 can significantly decrease rolling resistance, leading to about a 10% decrease in fuel consumption. Polyurethane has better abrasion resistance and, therefore, better tread wear than a traditional rubber tire and, unlike rubber, it is inert, making it resistant to oxidization or reaction with other materials that make rubber harden or even crack.

In another embodiment shown in FIGS. 17 and 18, the interconnected web 40 comprises web elements 42 that also contain strengthening components 46 such as carbon fibers, KEVLAR®, or some additional strengthening material to provide additional tensile strength to the interconnected web 40. Properties of the strengthening components 46 for certain embodiments can include high strength in tension, low strength in compression, light weight, good fatigue life and an ability to bond to the material comprising interconnected web 40.

Figure 19:
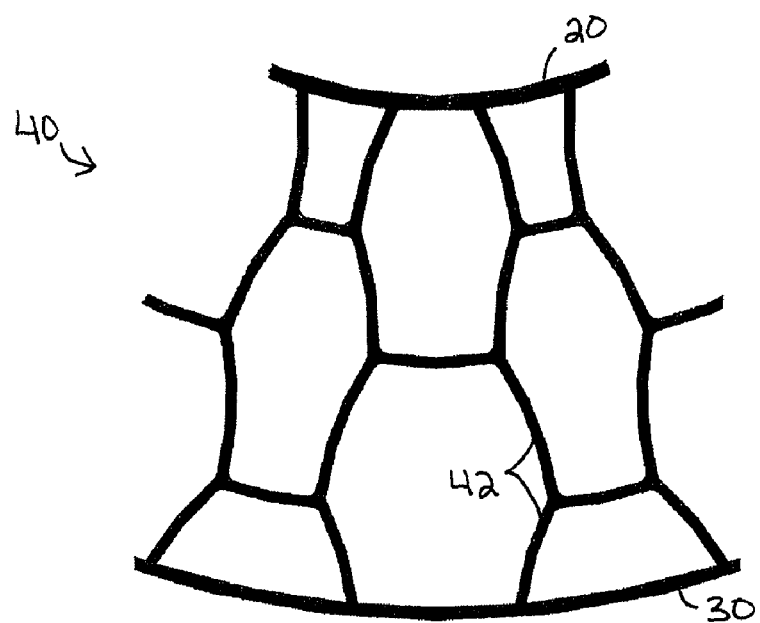
FIG. 19 is a cut-away front view of yet another embodiment of an undeformed non-pneumatic tire, with web portions which have a generally curved profile.

With reference to FIG. 19, further embodiments of the interconnected web 40 of tire 10 can comprise at least one web element 42 which is intentionally curved. For example, each web element 42 can have a first end comprising a first connection point and a second end comprising a second connection point, with the web element 42 extending radially between the first and second ends in a curved manner. Each of the connection points can join together one or more of the web elements 42 and/or the inner or outer ring 20, 30. In some embodiments, the web elements 42 can be curved in directions which facilitate buckling of the web 40 during loading of the tire. For example, and as illustrated in FIG. 19, the web elements 42 can form generally polygonal structures wherein the web elements forming the structures alternate between having generally concave and convex curvatures. Other configurations of curved web elements 42 are also possible. In some embodiments, the curved profiles of the web elements 42 can aid in keeping the elements 42 spatially separated from one another, thereby reducing the likelihood of the elements 42 contacting one another during buckling. Furthermore, the curved profiles of the web elements 42 can also inhibit noise and vibration which may otherwise result from having straight, linear web elements 42 throughout the web 40.

Figure 20:
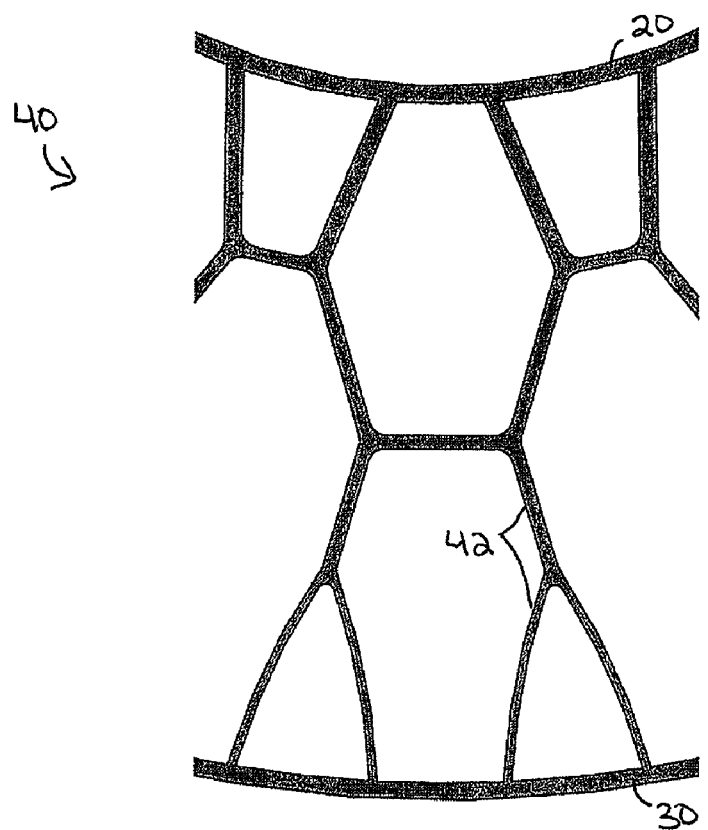
FIG. 20 is a cut-away front view of yet another embodiment of an undeformed non-pneumatic tire, with web portions which become thinner and increase in number moving away from the center of the tire.

With reference to FIG. 20, in some embodiments the interconnected web 40 can comprise web elements 42 which generally become thinner as they move radially away from the inner ring 20 and center of the tire 10. The thinning nature of the web elements 42 can, in some embodiments, reduce the amount of material used in the web 40 as compared with the web 40 of the embodiments described above, thereby allowing for a more light-weight tire 10. In some embodiments, and with continued reference to FIG. 20, the web elements 42 can not only decrease in thickness as they move closer to the outer edge of the tire, but also increase in number. This increase in the number of web elements 42 can lead to smaller openings, or gaps, between the ends of the web elements 42 which contact the outer ring 30. This reduction in opening size can inhibit noise and vibration in the tire 10. In some embodiments, at least a portion of the web elements 42 can also generally be curved similar to the web elements 42 shown in FIG. 19.

Figure 21:
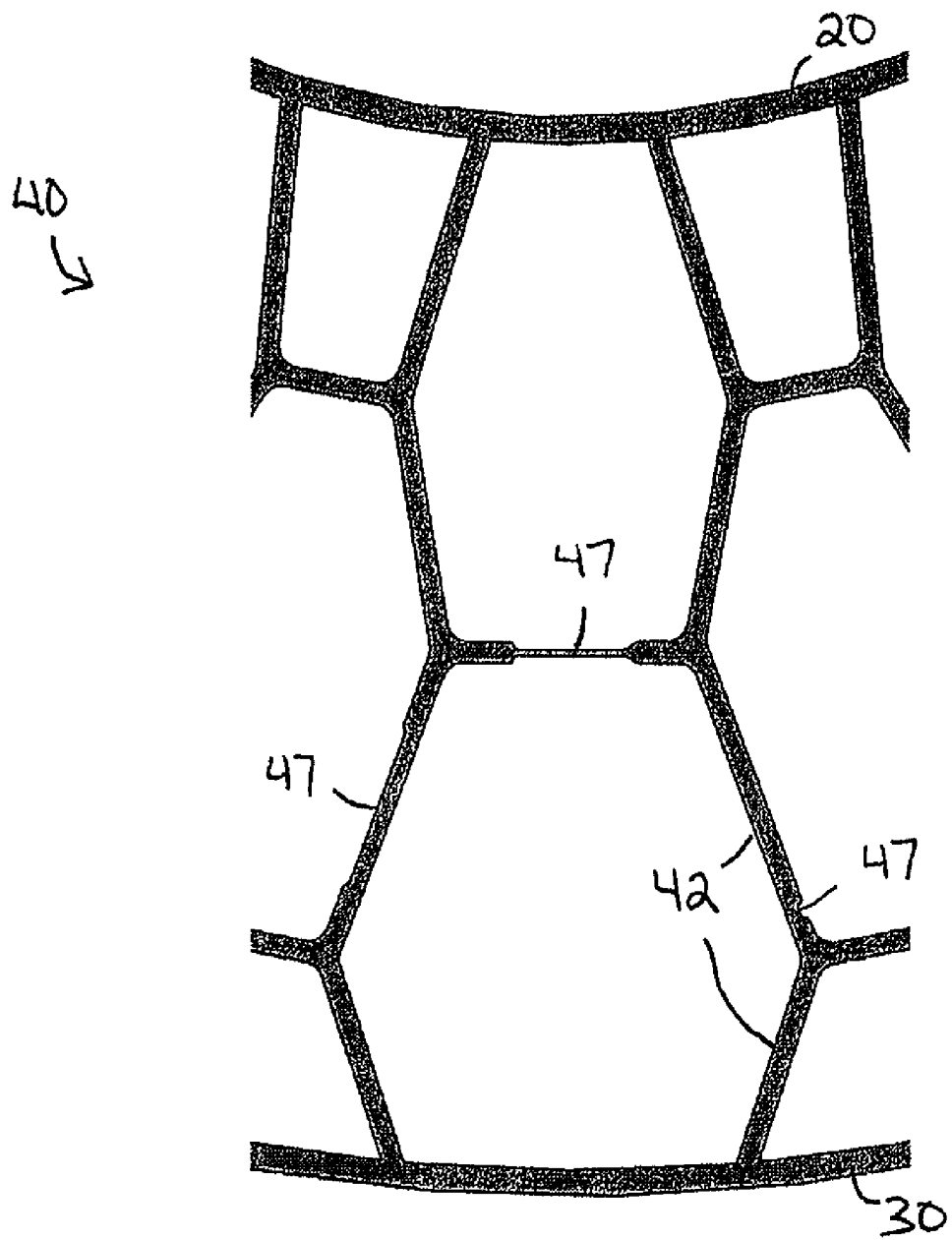
FIG. 21 is a cut-away front view of yet another embodiment of an undeformed non-pneumatic tire, with web portions which have varying thicknesses.

With reference to FIG. 21, in some embodiments at least one of the interconnected web elements 42 can have a varying thickness along its length. The varying thicknesses can facilitate directional buckling of individual web elements 42 in one or more given directions, and/or facilitate buckling on certain web elements 42 but not others. For example, one of the web elements 42 positioned generally along a plane transverse to a radius of the tire 10 can have a thinner portion 47 along a center portion of the web element 42. The thinner portion 47 can be bounded by two identical thicker portions of the web element 42, giving the web portion 42 a generally symmetrical shape. The thinner portion 47 of the web element 42 can facilitate directional buckling in either direction (i.e. buckling of the web element in a concave manner towards the outer ring 30, or in a convex manner towards the inner ring 20). In contrast, and with continued reference to FIG. 21, other web elements 42 in the web 40 can have notches or grooved portions which give the web element 42 a non-symmetrical shape. The thinner portions 47 formed in these web elements 42 can facilitate buckling in one direction more so than another, based on their generally non-symmetrical nature. Other shapes and configurations of notches and/or thinner portions 47 are also possible.

Furthermore, and with continued reference to FIG. 21, in some embodiments a varying thickness in the web element 42 can aid in reducing what would otherwise be a high stress area within the web 40. For example, the web element 42 can include portions of varying thickness to absorb stresses imposed during tensioning of the web elements during loading, thereby increasing the amount of stress the web element 42 can withstand prior to fracture or failure. For example, the web element 42 can have a thicker cross-section in the area where it experiences the greatest tensile loading, and a thinner cross-section in other areas.

Figure 23:
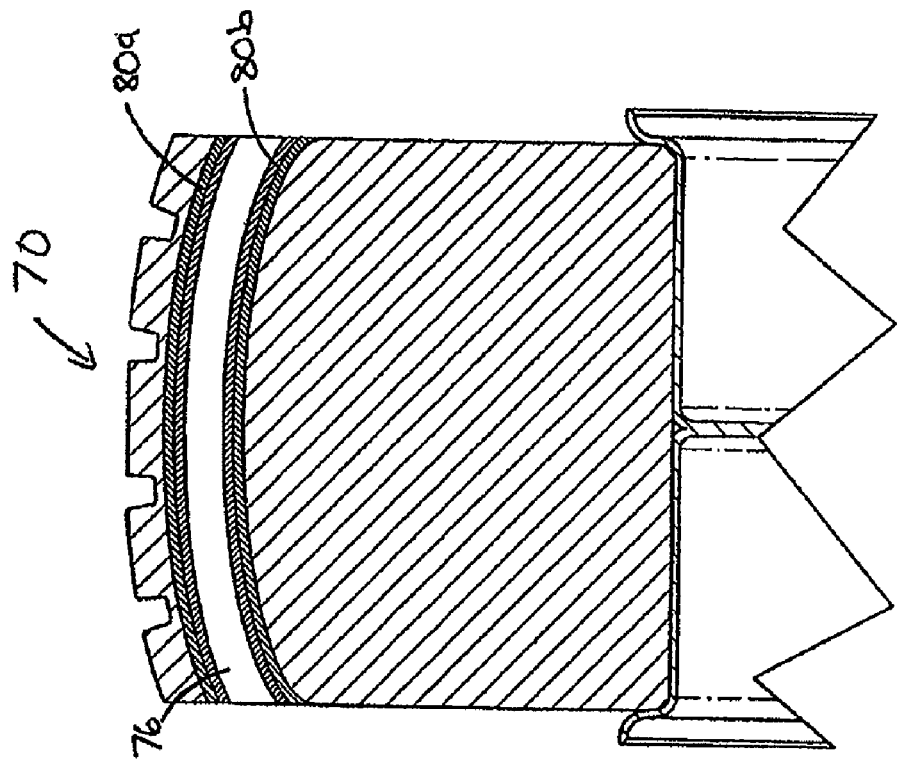
FIG. 23 is a cross sectional view of an embodiment of the shear layer of a non-pneumatic tire.
Figure 22:
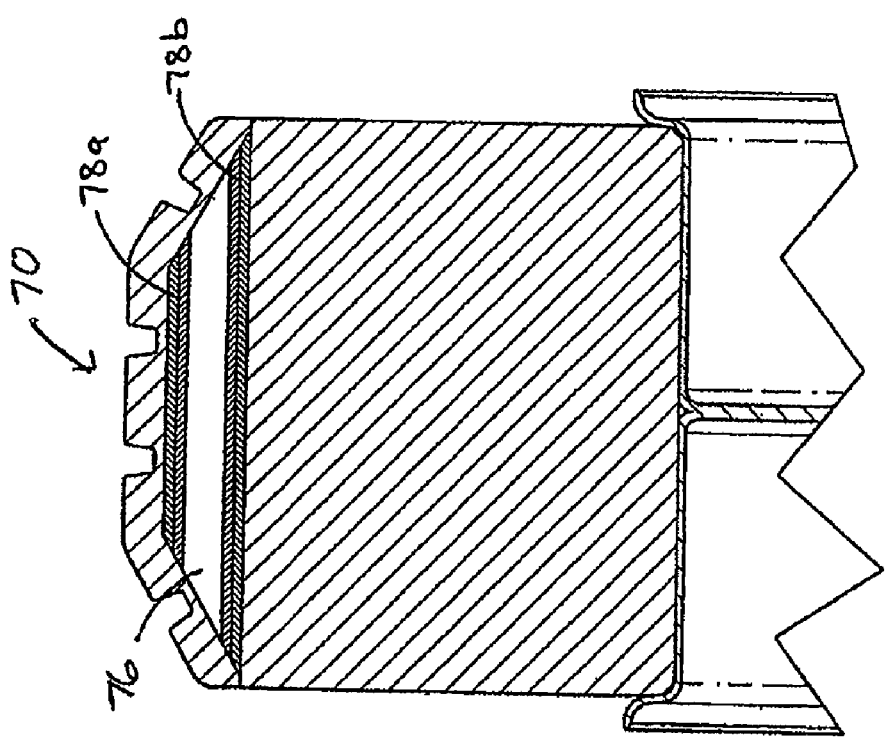
FIG. 22 is a cross sectional view of an embodiment of the shear layer of a non-pneumatic tire.

With reference back to the tread and shear layers, in the embodiments shown in FIGS. 22 and 23, a crowned (FIG. 22) or rounded configuration (FIG. 23) of the components of the tread layer 70 can be utilized to prevent or reduce excessive drag on the edges of the tread and shear layer 70 during steering or cornering of the vehicle.

Thus, for example, and with reference to FIG. 22, in at least one embodiment the tread carrying layer 70 can comprise inner belt layers 78a and 78b. The belt layer 78a can have a larger width than the belt layer 78b, giving the tread carrying layer 70 a generally crowned or rounded shape. A layer of support material 76 can be placed between the belt layers 78a and 78b.

With reference to FIG. 23, in at least another embodiment the tread carrying layer 70 can comprise belt layers 80a and 80b. Both belt layers 80a and 80b can be curved in order to give the tread carrying layer 70 a generally crowned or rounded shape. Again, a layer of support material 76 can be placed between belt layers 80a and 80b.

The tread carrying layer 70 of FIGS. 11-13, 22 and 23 described above can be manufactured similar to pneumatic tires. For example, in one embodiment, each layer of the tread carrying layer can be manufactured separately in rolls. The thicknesses of the rolls can vary. In at least one embodiment, some of the rolls can be rubber, while other rolls can comprise a steel belting that is coated in a rubber compound and configured for a particular belt angle for a particular tire. Each of the rolls can be brought to a tire building machine, and wrapped onto the machine in a particular order. The last layer can generally comprise a thick layer of rubber to be used as the exterior tread for the tire.

After wrapping each layer, the entire assembly can be brought to a mold. The outer diameter of the mold can have the reverse pattern of the tread engraved in it. The mold can be heated to a temperature that allows the rubber to easily deform and/or flow. The assembly can be set in the mold, and pressure can be applied from the inside to force the tread against the outer wall of the mold, which converts the thick outer layer into a patterned tread. The assembly can sit within the mold under heat and pressure for a specified period of time, allowing the rubber layers to vulcanize and generally transform from several individual layers into one solid layer.

Once a tread carrying layer has been manufactured as described above, the tread carrying layer 70 can be connected to the interconnected web 40. Various methods can be used. For example, at least one arrangement comprises overmolding the interconnected web 40 directly onto the radially inwardly facing surface of the tread carrying layer 70. An adhesive can be sprayed onto the inside diameter of the tread carrying layer 70 and outside diameter of the tire's wheel 60. In one embodiment, a mold can then be filled with liquid urethane. The adhesive on the tread layer 70 and wheel 60 of the tire 10 can form a bond with the urethane. Once the urethane cures and stiffens, the interconnected web 40 will be molded to both the tread carrying layer 74 and tire wheel 60.

In another embodiment, the interconnected web 40 can first be made separately in its own mold. The outside diameter of the interconnected web 40, or the generally annular outer ring 30, can be formed so that it is slightly larger than the inside diameter of the tread carrying layer 70. An adhesive can be applied to the outside diameter of the interconnected web 40. The interconnected web 40 can then be temporarily compressed so that it can be placed into the tread carrying layer 70. Once the interconnected web is positioned correctly, the compression on the interconnected web 40 can be removed. The interconnected web 40 can then spread out and contact the tread carrying layer 70. This method can reduce the residual tension (caused by shrinking of the web material as it cures) that might occur by molding the interconnected web 40 and attaching it to the tread carrying layer 70 at the same time as discussed above.

As mentioned above, the tire 10 can be coupled to the wheel 60 of a vehicle. In at least one embodiment, a generally cylindrical component can fasten to the non-pneumatic tire's wheel 60. For example, with reference to FIGS. 24 and 25, an embodiment of a non-pneumatic tire 110 can comprise a hollow metal (or other material) cylinder 112 configured for attachment to an existing HMMWV or other vehicle's wheel components 114, 116. The cylinder 112 can include a flanged portion 118 extending towards the interior hollow portion of the cylinder 112. The flange 118 can have holes 119a which align with holes 119b in the wheel components 114, 116, thereby facilitating attachment of the cylinder 112 and wheel 114, 116 by bolts or other fasteners (not shown). While the embodiment shown discloses a flange 118 that extends circumferentially around the interior of the cylinder 112, in other embodiments the flange 118 can extend around only a portion of the interior of the cylinder 112. In yet other embodiments, there can be a plurality of flanges spaced apart around the interior of the cylinder 112.

At least a portion of cylinder 112 can be coupled to the generally annular inner ring 20 as described above. Thus, an interconnected web 40 and a generally annular outer ring 30, such as any of those shown in FIGS. 1-21, can be attached to the exterior, or radially outwardly facing surface, of cylinder 112 via molding, adhesion, or other methods of attachment. The cylinder 112, the interconnected web 40, the inner ring 20, and the generally annular outer ring 30 can then be attached to the wheel 112, 114.

Figure 24:
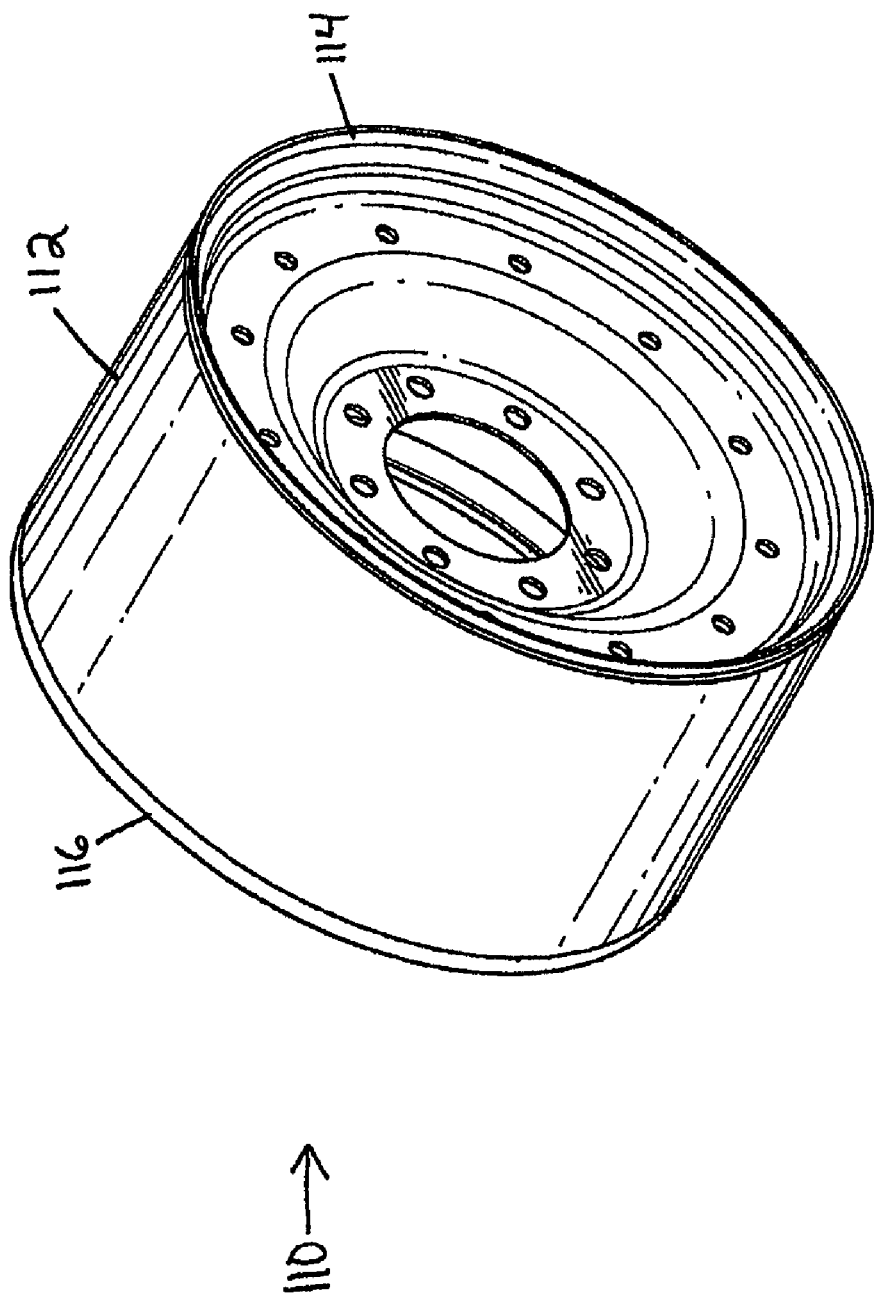
FIG. 24 is a perspective view of an embodiment of a non-pneumatic tire incorporating a cylinder and two wheel components.
Figure 25:
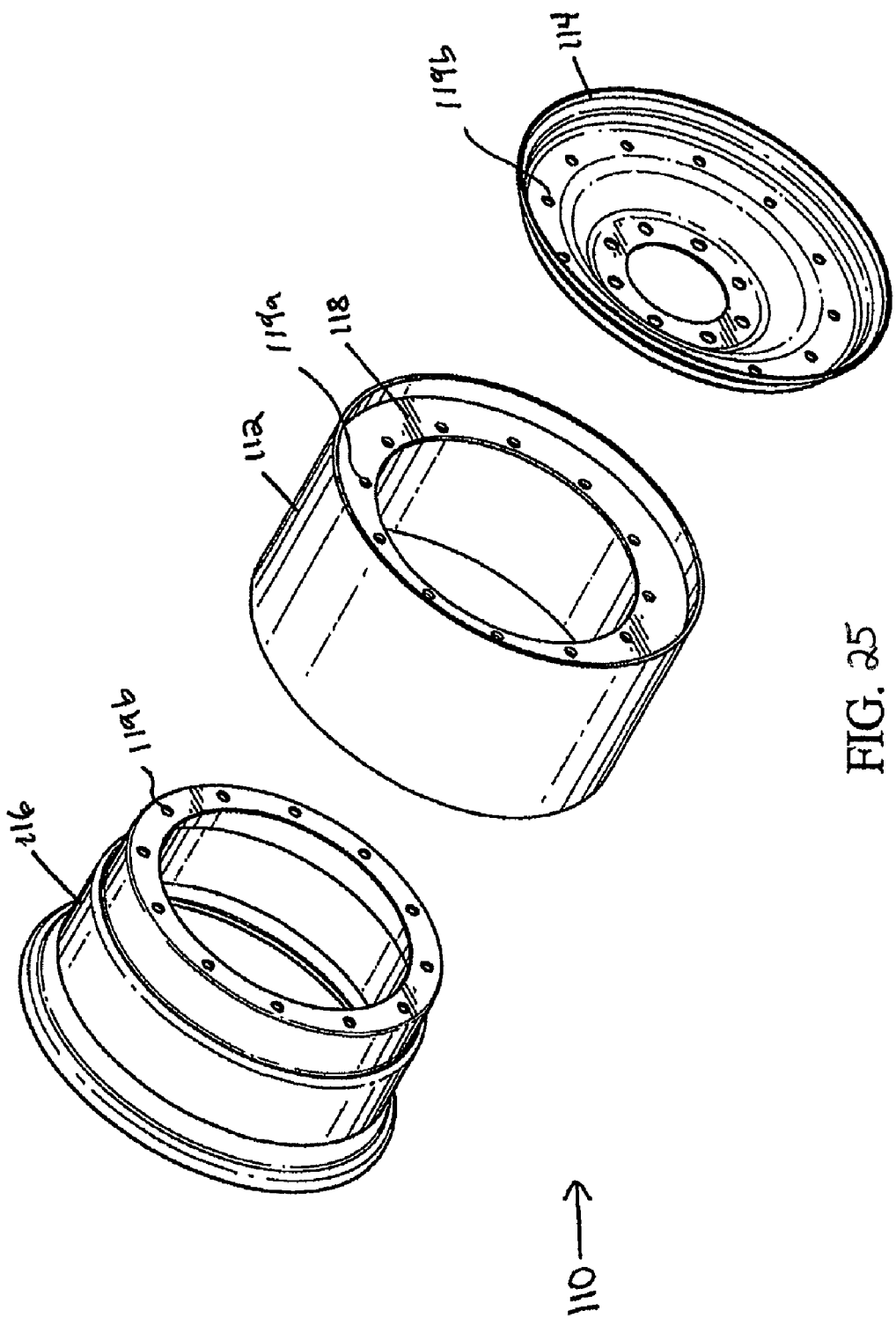
FIG. 25 is an exploded view of the embodiment of FIG. 24.

The tire configuration of FIGS. 24 and 25 provides an advantage in tire servicing and replacement. For example, the cylinder 112 and wheel components 114, 116 can easily be removed from one another by removing the bolts or other fasteners. Once the bolts are removed, the tire 10 can quickly be serviced, and/or parts of the tire 10 can quickly and easily be replaced.

Figure 26:
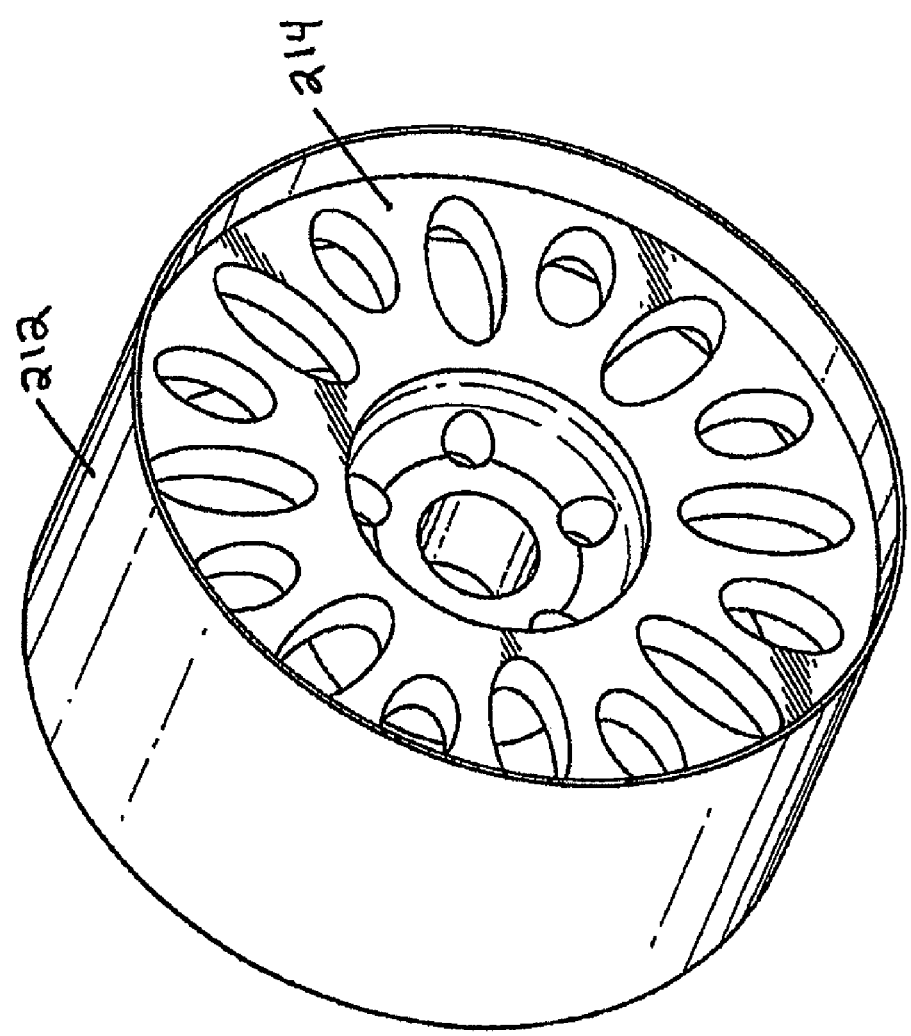
FIG. 26 is a perspective view of an embodiment of a non-pneumatic tire incorporating a cylinder and wheel plate.
Figure 27:
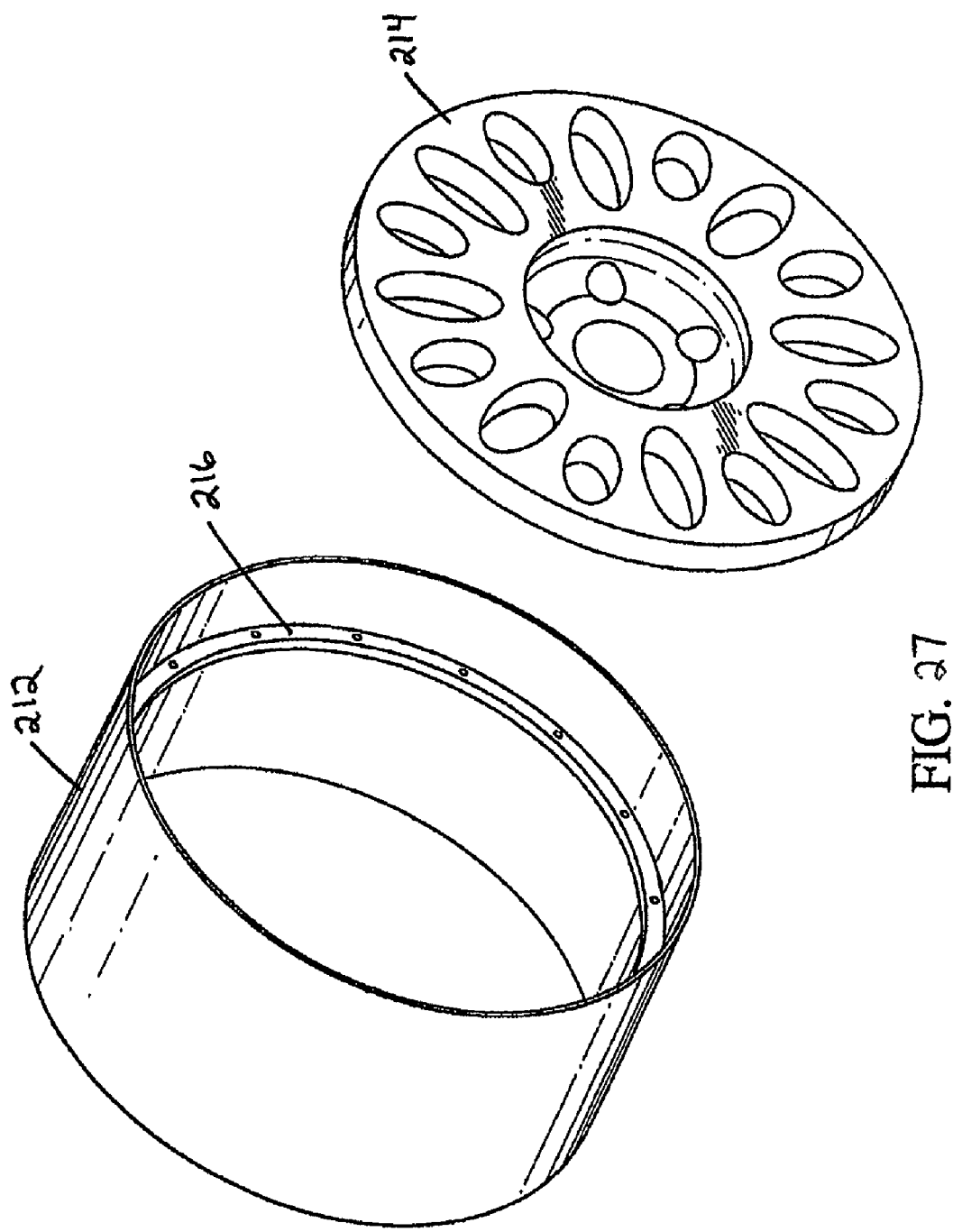
FIG. 27 is an exploded view of the embodiment of FIG. 26.

With reference to FIGS. 26 and 27, another embodiment of a non-pneumatic tire 210 can comprise a metal (or other material) cylinder 212. Cylinder 212, much like cylinder 112 of the preceding embodiment, can include a flange 216 with holes configured for attaching cylinder 212 with wheel plate 214. Just as with cylinder 112, the inner ring 20, the interconnected web 40 and the generally annular outer ring 30, such as any of those shown in FIGS. 1-21, can be attached to the radially outwardly facing surface of cylinder 212 via molding, adhesion, or other methods of attachment. The single metal wheel plate 214 can quickly and easily be removed from the rest of the tire in order to service the tire or replace parts.

In yet another embodiment, the interconnected web and the generally annular outer ring, such as any of those shown in FIGS. 1-21, can be directly attached to an existing wheel rim (not shown) without use of a cylinder such as cylinder 112 or 212. Thus, instead of removing any bolts and replacing or servicing different parts of the tire, the tire can simply be discarded when it has worn down.

Additionally, in yet another embodiment, an interconnected web can be directly engaged by a wheel, tread carrying layer, or both. For example, a wheel and tread carrying layer can either or both comprise dovetail joints. The wheel and tread carrying layer can then be inserted into a mold with the material comprising the interconnected web filling the joints. In this case, the generally radially outwardly facing surfaces of the wheel comprise the generally annular inner surface of the tire, and the generally radially inwardly facing internal surface of the tread carrying layer comprises the generally annular outer ring. Therefore, when the interconnected web sets, the interconnected web is directly engaged, obviating the need to bond or otherwise affix the interconnected web to the generally annular outer ring.

Non-pneumatic tires, including those that use an interconnected web as discussed above, can also incorporate the use of a sidewall or some other structure capable of covering and protecting the interconnected web 40 and tire 10. Use of a sidewall helps to ensure that debris, water, or other material does not enter the tire, including the interconnected web area, and interfere with the tire's functionality and performance. The sidewall can also help prevent damage to the web from projectiles or other debris.

Figure 29:
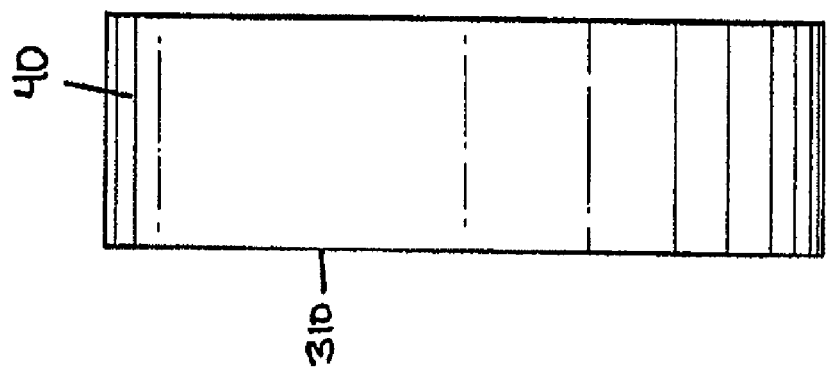
FIG. 29 is a left side view of the sidewall in FIG. 28.
Figure 28:
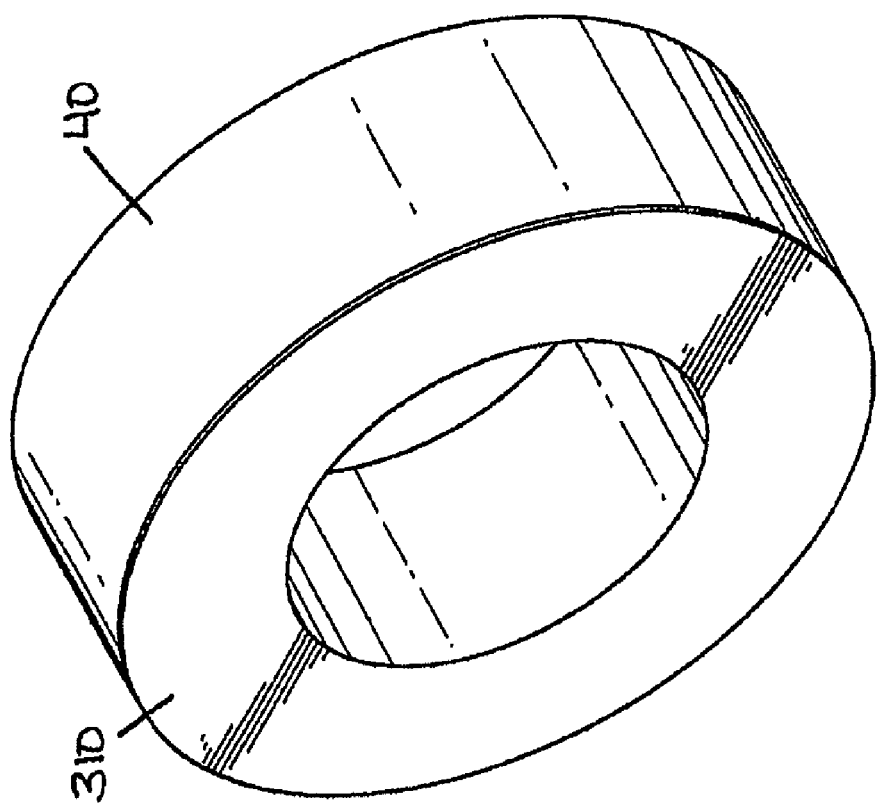
FIG. 28 is a perspective view of an embodiment of a non-pneumatic tire, including a sidewall integrated with the interconnected web.

With reference to FIGS. 28 and 29, a sidewall 310 can be attached to or integrated with an interconnected web 40. In at least one embodiment, the sidewall 310 can be adhered directly to at least one side of the interconnected web 40. The sidewall 310 can be entirely flat when viewed from its side, as illustrated in FIG. 29, such that it can be bonded directly to the edges of each or some of the interconnected web element 42 exposed along the outside of the tire 10. The sidewall 310 can be manufactured separately as one piece and then adhered to the interconnected web 40, or the sidewall can be integrated directly into the interconnected web's molding during production of the web 40.

With continued reference to FIGS. 28 and 29, the sidewall 310 can cover all, or only a portion of, the side of the interconnected web 40. By attaching or integrating a sidewall 310 onto at least a portion of the interconnected web 40, debris or other material can be prevented from entering the interconnected web area of the tire 10 and interfering with the web elements 42.

The sidewall 310 can be made from the same material as that of the interconnected web 40, or the material can be different, such as rubber. In some embodiments, the material for both the interconnected web 40 and sidewall 310 is cast polyurethane. Additionally, in some embodiments the sidewall 310 can have a lower stiffness than that of the interconnected web elements 42. By having a lower stiffness, the sidewall 310 as illustrated in FIGS. 28 and 29 will generally not support any of the loads acting on the tire 10. Instead, the sidewall 310 can bend or flex during loading in the areas between the interconnected web elements 42, allowing the interconnected web elements 42 to continue supporting the loads acting on the tire 10. In other embodiments, the sidewall 310 can support a load.

In an additional embodiment, and with continued reference to FIGS. 28 and 29, the sidewall 310 can be adhered to or integrated with the interconnected web 40 only near the generally annular inner ring 20 and the generally annular outer ring 30. In such embodiments, the sidewall 310 is not adhered to or integrated with some of the interconnected web elements 42 located between the generally annular inner ring 20 and generally annular outer surface 30. This allows sidewall 310 the freedom to flex and bend in the region between the generally annular inner 20 and the generally annular outer rings 30, instead of only in those areas between the interconnected web elements 42.

Figure 31:
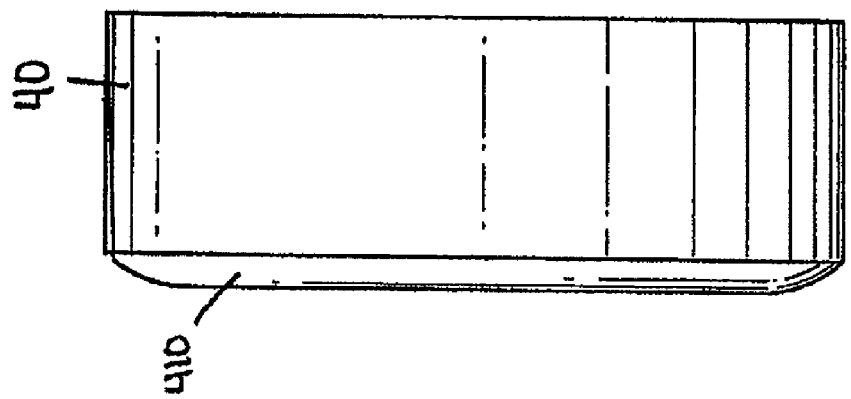
FIG. 31 is a left side view of the sidewall in FIG. 30.
Figure 30:
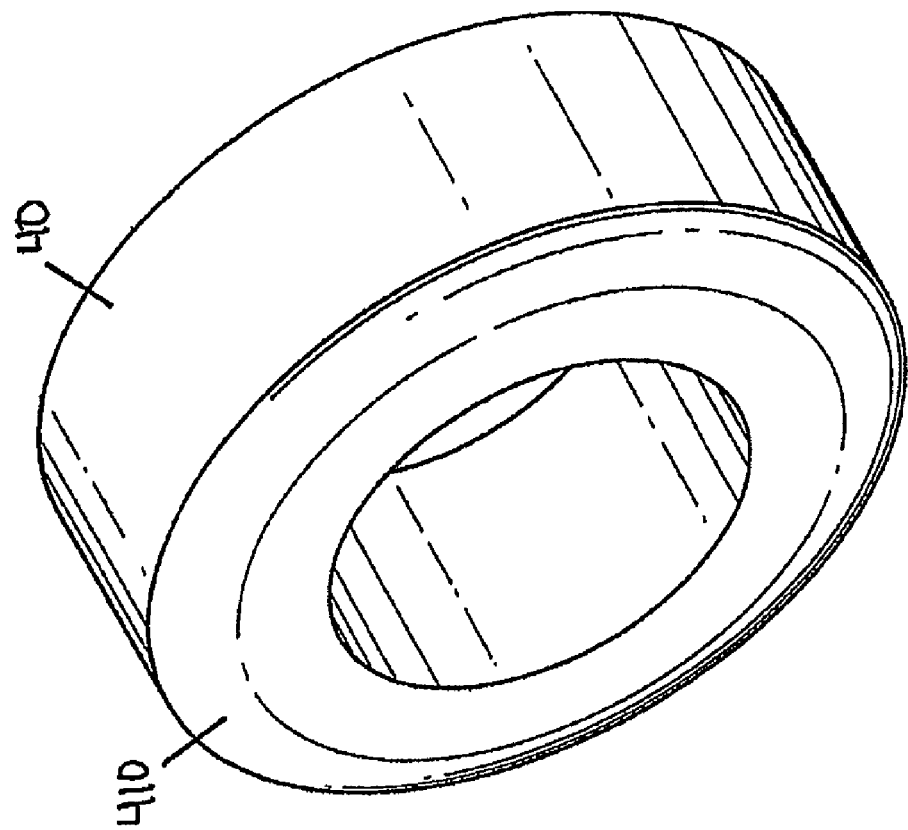
FIG. 30 is a perspective view of an embodiment of a non-pneumatic tire, including a sidewall integrated with the interconnected web.

With reference to FIGS. 30 and 31, an additional embodiment of a sidewall 410 can have a generally "domed" or flexed shape, as opposed to the flat shape of sidewall 410 as shown in FIG. 29. In this embodiment, the sidewall 410 can be adhered to or integrated with the interconnected web 40 as discussed above near both the generally annular inner ring 20 and the generally annular outer ring 30. The "domed" shape of the sidewall 410, as illustrated in FIG. 31, biases the sidewall 410 to deform in a prescribed direction (i.e. away from the web 40), as opposed to buckling or deforming in towards the web 40 and interconnected web elements 42. Just as with the previous embodiments, the sidewall 410 and interconnected web 40 can be made of the same material, or different materials. In some embodiments, the interconnected web material 40 is cast polyurethane, and the sidewall 410 rubber.

In yet additional embodiments, the sidewalls 310, 410 described above can be made separate from the interconnected web, and be removable from the tire for servicing and/or replacement. For example, the sidewall 310, 410 can be held in place adjacent the interconnected web 40 by a flange or flanges encircling the tire 10. The flanges (not shown) can be made from material having low stiffness so as to prevent the flanges from interfering with the functionality and performance of the interconnected web elements 42. The flanges can be adhered to or integrated with the interconnected web 40 or other portions of the tire 10. In at least some embodiments, the sidewall can slide out from the grip of the flanges. In yet other embodiments, the flanges can bend or flex, allowing the sidewall to be inserted or removed. In yet other embodiments, the sidewall can be flexible enough to bend and to be inserted into the stationary flanges.

In yet additional embodiments, instead of an actual wall along the side(s) of the interconnected web 40, the interconnected web 40 can be filled partially or wholly with filler, for example, a foam material. In at least one embodiment, the foam can comprise polyurethane foam. By filling the interconnected web 40 with foam or similar material, debris can be prevented from entering the areas between the interconnected web elements 42, which can substantially interfere with the tire's functionality and performance. At the same time, the foam can be flexible. Thus, the foam itself generally will not support any loads on the tire, instead allowing the tire's interconnected web elements to continue supporting the loads. In addition, in other modified embodiments, the filler can be used to support some of the load. As mentioned above, non-foam materials can also be used.

In yet additional embodiments, non-pneumatic tires can incorporate sidewalls similar to pneumatic tires. The sidewalls can be vulcanized to the tread portion of the generally annular outer ring and additionally mounted to the rim of the wheel after the interconnected web has been formed.

Sidewall thicknesses can vary, depending on factors including, but not limited to, the expected applied loads the tire will experience during use, as well as material strength and flexibility. For example, in at least one embodiment, a sidewall comprised of rubber can have a thickness of approximately 0.09375". In at least some embodiments, the thickness of the sidewall can also vary across each individual sidewall.

Advantageously, the embodiments of a non-pneumatic tire described above exhibit many of the same performance characteristics as traditional pneumatic tires. For example, the non-pneumatic tire can demonstrate a general ride quality and traction similar to current pneumatic tires. The non-pneumatic tire 10 can also have costs, weight, load supporting capability and tread life similar to current pneumatic tires.

However, the non-pneumatic tires of the embodiments described herein demonstrate several advantages over standard pneumatic tires. For example, in addition to virtually eliminating blowouts and flat tires, the ability of the generally annular outer ring 30 and the interconnected web 40 to deform in an area around footprint region 32 as shown in FIG. 2 reduces the stresses placed on wheel 60 when hitting a bump, pothole, or similar obstacle, thereby making non-pneumatic tire 10 and wheel 60 less susceptible to damage. Without relying on air pressure to maintain its functionality, interconnected web 40 of non-pneumatic tire 10 can also be better able to withstand damage caused by projectiles. If a portion of interconnected web 40 is damaged, the applied load L, which is generally applied perpendicular to axis of rotation 12, can be transferred to the remaining elements so that a vehicle relying on non-pneumatic tires 10 is not immediately disabled. In addition, because non-pneumatic tire 10 cannot be over- or under-inflated, footprint region 32 can remain generally constant, improving fuel efficiency as compared to traditional pneumatic tires.

The generally annular outer ring 30 combined with interconnected web 40 can display higher lateral stiffness compared to standard pneumatic tires, especially in the embodiment in which the tread carrying layer 70 is attached. Therefore, while general ride quality can be similar to standard pneumatic tires, non-pneumatic tire 10 can achieve improved cornering ability. The non-pneumatic tire 10 can also require less maintenance by obviating the need to check and maintain air pressure.

Additionally, a major advantage of using a non-pneumatic tire compared to a standard tire is eliminating flat tires. If a portion of the web is compromised, the load will be redistributed through other elements of the web by virtue of the fact that the web is interconnected, prolonging the life of the tire. In addition, by not carrying any significant load along a footprint region where the tire contacts a surface, a smoother ride results since the non-pneumatic tire is less susceptible to shock and vibration.

Besides its benefits over traditional pneumatic tires, non-pneumatic tire 10 can exhibit multiple advantages over other non-pneumatic tires. Most of these other tires have solid rim and a solid tire section and are in production for low-speed applications. In comparison to these tires, the non-pneumatic tire 10 can be significantly lighter. The interconnected web 40 can allow non-pneumatic tire 10 to absorb impacts significantly better, resulting in a more comfortable ride. In addition, other non-pneumatic tires are not usable at high speeds due to the amount of vibration that is generated. Some conventional non-pneumatic tires work by placing the portion of the tire that is between the applied load L and the contact surface in compression. This causes that section of the tire and its internal structure to deform under the load. When the body to which the tire is attached is not in motion, this portion of the tire remains deformed under the static load. Over time, this can lead to semi-permanent deformation of the tire causing decreased performance, increased noise vibration and worse fuel efficiency, among other things. In contrast, buckled section 48 carries very little, if any, load so the tire can remain statically deformed for a while and not experience any appreciable semi-permanent deformation.

In comparison to other tension-based non-pneumatic tires, tire 10 can demonstrate even further benefits. Non-pneumatic tire 10 can experience smaller stresses and strains under loading conditions than other tension-based non-pneumatic tires. By allowing air to flow through the tire 10 and around web elements 42, the design of interconnected web 40 can result in less heat generation as well as less fatigue, prolonging the life of tire 10. The ability of interconnected web 40 to buckle around footprint region 32, thereby causing less reactive force when passing over an obstacle, can also result in less vibration and a better ride. Despite the ability of interconnected web 40 to buckle, it can also be relatively stiff when compared to the internal structure of other tension-based non-pneumatic tires. This can result in less noise being generated, resulting in a quieter ride. It can also cause non-pneumatic tire 10 to experience better starting and stopping performance.

EXAMPLE

In one non-limiting example embodiment, a non-pneumatic tire 10 possesses the interconnected web 40 of the configuration shown in FIGS. 1 and 2. Tire 10 has a radius of about 9.5 inches and wheel 60 has a radius of about 4⅜ inches.

In general, the force required for buckling of a column is governed by the equation: $F\_buckling=(KEI\pi^2)/l^2$ where K=a constant whose value depends on how the ends of the column are affixed, E=tensile modulus, I=the area moment of inertia, and l=the unsupported length of the column.

If each web element 42 of interconnected web 40 is modeled as its own thin column, the radially innermost elements will be fixed at one end and free to move laterally at another end. In this example, K=¼

In this example, the interconnected web 40 and the generally annular outer ring 30 are made of a similar material having a tensile modulus, E, of about 21 MPa or 3050 psi.

Tire 10 can be about 8 inches wide. As noted above, in preferred embodiments, each web element 42 of interconnected web 40 can be between about 0.04 inch and 0.1 inch thick for tire loads of about 0-1000 lbs, between about 0.1 and 0.25 inch thick for loads of about 500-5000 lbs, and between 0.25 and 0.5 inch thick for loads of about 2000 lbs or greater. A thickness of about 0.08 inch will be used for this example. In this case, the area moment of inertia, $I=(w*h^3)/12$ where w=the width of each web element 42, 8 inches and h=the thickness, 0.08 inch. Therefore, I is about 0.000341 in^4.

Using the tire and wheel radii mentioned above, and observing the pattern of interconnected web 40 as seen in FIGS. 1 and 2, each web element 42 can have an approximate length of about (9.5"–4.375")/4, or approximately 1.28 inch.

Based on these numbers, $F\_buckling=(KEI\pi^2)/l^2$=about 1.59 lbs. In addition, web elements 42 of interconnected web 40 are angled with respect to a radial direction to facilitate buckling, which can further decrease F_buckling.

In this application, non-pneumatic tire 10 is subjected to a load, L, of about 250 lbs. Load, L, is distributed throughout web elements 42 such that the entire load, L, is not borne by a single web element, 42. However, the web elements 42 most directly aligned with the direction of load, L, should bear the greatest portion of the load. Since L is significantly larger than F buckling, elements 42 of interconnected web 40 that are subjected to a compressive force will buckle and not support load, L.

While the foregoing written description of embodiments of the invention enables one of ordinary skill to make and use what is considered presently to be the best mode thereof, those of ordinary skill will understand and appreciate the existence of variations, combinations, and equivalents of the specific exemplary embodiments and methods herein. The invention should therefore not be limited by the above described embodiment and method, but by all embodiments and methods within the scope and spirit of the invention as claimed.

What is claimed is:

1. A non-pneumatic tire for supporting a load comprising:
a generally annular inner ring having an axis of rotation;
a deformable generally annular outer ring; and
a flexible interconnected web extending between said inner and said outer ring, the interconnected web comprising at least two radially adjacent layers of web elements at every radial cross-section of said tire, the web elements defining a plurality of generally polygonal openings and comprising a plurality of radial web elements that are angled relative to a plane that extends radially through the axis of rotation and a plurality of distinct tangential web elements that are generally transverse to the radial plane;
wherein at least one of the web elements has a first end comprising a first connection point, and a second end comprising a second connection point, the web element extending radially in a curved manner between the first and second ends;
wherein a substantial amount of said load is supported by a plurality of said web elements working in tension, wherein, when an applied load is applied, a plurality of the radial web elements in a region above the axis of rotation are subjected to a tensile force while at least some of the radial web elements in a region between the applied load and a footprint region buckle and a plurality of the tangential web elements distribute the applied load through the flexible interconnected web.

2. A non-pneumatic tire according to claim 1, wherein the web elements gradually become thinner moving radially away from the center of the tire.

3. A non-pneumatic tire according to claim 1, wherein at least one of the web elements has various thicknesses along its length.

4. A non-pneumatic tire according to claim 1, further comprising a tread carrying layer affixed to a radially external surface of said outer ring, said tread carrying layer support supporting said web elements working in tension.

5. A non-pneumatic tire according to claim 1, wherein said plurality of generally polygonal openings comprises a first plurality of generally polygonal openings having a first shape and a second plurality of generally polygonal openings having a second shape different from said first shape.

6. A non-pneumatic tire according to claim 5, wherein at least one of said first plurality of generally polygonal openings and at least one of said second plurality of generally polygonal openings are traversed when moving in any radially outward direction from said axis of rotation.

7. A non-pneumatic tire according to claim 5, wherein each of said first plurality of generally polygonal openings has a first inner boundary spaced at a first radial distance and each of said second plurality of generally polygonal openings has a second inner boundary spaced at a second, greater radial distance.

8. A non-pneumatic tire according to claim 7 wherein at least one generally polygonal opening of said first plurality of generally polygonal openings is larger than at least one generally polygonal opening of said second plurality of generally polygonal openings.

9. A non-pneumatic tire according to claim 1, wherein one web element engages said inner ring at a given location with the web element's first connection point.

10. A non-pneumatic tire according to claim 1, wherein one web element engages said outer ring at a given location with the web element's second connection point.

11. A non-pneumatic tire according to claim 1, wherein a connection point joins at least three web elements.

12. A non-pneumatic tire according to claim 1, wherein said inner ring has a first thickness, said outer ring has a second thickness, and said web elements have a third thickness, said third thickness being smaller than said first thickness or said second thickness.

13. A non-pneumatic tire according to claim 1, further comprising web elements that extend in a substantially radial direction with respect to the axis of rotation.

14. A non-pneumatic tire according to claim 1, wherein each one of said plurality of generally polygonal openings is radially oriented.

15. A non-pneumatic tire according to claim 1, wherein each one of said plurality of generally polygonal openings has at least 3 sides.

16. A non-pneumatic tire according to claim 1, wherein said plurality of generally polygonal openings are generally hexagonally shaped.

17. A non-pneumatic tire according to claim 1, further comprising a plurality of joined segments each having a width narrower than a width of said tire.

18. A non-pneumatic tire according to claim 17 wherein a first joined segment is circumferentially offset from an adjoining segment.

19. A non-pneumatic tire according to claim 17, wherein a first joined segment has an interconnected web that is substantially similar to an interconnected web of a second joined segment.

20. A non-pneumatic tire according to claim 1, wherein a relatively radially inner layer of said plurality of generally polygonal openings comprises alternating generally wedge-shaped openings.

21. A non-pneumatic tire according to claim 1, wherein each one of said plurality of generally polygonal openings is generally symmetrical about a radial symmetry plane.

22. A non-pneumatic tire according to claim 1, wherein said interconnected web comprises a generally continuous, generally radially constant web element intermediate said inner ring and said outer ring.

23. A non-pneumatic tire according to claim 1, wherein said inner ring is adhesively engaged with said wheel.

24. A non-pneumatic tire according to claim 1, wherein said inner ring is chemically bonded to said wheel.

25. A non-pneumatic tire according to claim 1, wherein said interconnected web is made of a polymer.

26. A non-pneumatic tire according to claim 1, wherein said web elements comprise additional strengthening components.

27. A non-pneumatic tire according to claim 1, further comprising a sidewall along at least a portion of the interconnected web.

28. A non-pneumatic tire of claim 27, wherein said sidewall is attached to at least a portion of said interconnected web.

29. A non-pneumatic tire of claim 27, wherein said sidewall is integrally formed with at least a portion of said interconnected web.

30. A non-pneumatic tire of claim 27, wherein said sidewall has a domed shape that extends away from the interconnected web.

31. A non-pneumatic tire according to claim 1, further comprising a tread carrying layer affixed to a radially external surface of said outer ring.

32. A non-pneumatic tire according to claim 31, wherein said tread carrying layer comprises reinforcing belts.

33. A non-pneumatic tire according to claim 31, wherein a cross-section of said tread carrying layer taken along a plane extending radially from the tire's center has a rounded shape.

34. A non-pneumatic tire according to claim 31, wherein a cross-section of said tread carrying layer taken along a plane extending radially from the tire's center has a crowned shape.

35. A non-pneumatic tire for supporting a load comprising:
a generally annular inner ring that attaches to a wheel, a generally annular outer ring,
an interconnected web between said generally annular inner ring and said generally annular outer ring, and
an axis of rotation;
said interconnected web defining a plurality of openings circumferentially spaced around said tire and radially spaced at varying distances from said axis of rotation, so as to support a load by working in tension;
wherein said interconnected web comprises at least one web element having a curved profile relative to a radial plane extending through said tire;
wherein said curved profile is configured to facilitate buckling of said interconnected web;
wherein, when an applied load is applied, a plurality of the web elements in a region above the axis of rotation are subjected to a tensile force while at least some of the web elements in a region between the applied load and a footprint region buckle.

36. A non-pneumatic tire for supporting a load comprising:
a generally annular inner ring that attaches to a wheel,
a generally annular outer ring,
an interconnected web between said generally annular inner ring and said generally annular outer ring, and
an axis of rotation;
said interconnected web comprising web elements having first ends comprising first connection points, and second ends comprising second connection points, the web elements extending radially in a curved profile between the first and second ends and defining a plurality of openings circumferentially spaced around said tire and radially spaced at varying distances from said axis of rotation, so as to support a load by working in tension;
wherein, when an applied load is applied, a plurality of the web elements in a region above the axis of rotation are subjected to a tensile force while at least some of the web elements in a region between the applied load and a footprint region buckle.

* * * * *

UNITED STATES PATENT AND TRADEMARK OFFICE
CERTIFICATE OF CORRECTION

PATENT NO.         : 8,176,957 B2
APPLICATION NO.    : 12/506169
DATED              : May 15, 2012
INVENTOR(S)        : Ali Manesh et al.

Page 1 of 1

It is certified that error appears in the above-identified patent and that said Letters Patent is hereby corrected as shown below:

In the Claims:

In Claim 4, at column 19, line 14, please delete the word "support"

Signed and Sealed this
Twenty-sixth Day of November, 2013

Margaret A. Focarino
*Commissioner for Patents of the United States Patent and Trademark Office*